United States Patent
Sakurai et al.

[19]

[11] Patent Number: 5,816,661
[45] Date of Patent: Oct. 6, 1998

[54] VEHICLE SEAT STRUCTURE

[75] Inventors: Hideaki Sakurai; Toshimi Sugiyama; Yasuo Ohnishi; Kenji Takahashi; Kyouji Yamamoto, all of Toyota, Japan

[73] Assignee: Toyota Jidosha Kabushiki Kaisha, Toyota, Japan

[21] Appl. No.: 763,945

[22] Filed: Dec. 12, 1996

[51] Int. Cl.⁶ .................................................. A47C 7/02
[52] U.S. Cl. ........................ 297/452.48; 297/452.46; 297/452.47; 5/730
[58] Field of Search .............. 297/452.48, 452.26, 297/452.27, 452.32, 452.35, 452.37, 452.46, 452.47, DIG. 1; 5/730

[56] References Cited

U.S. PATENT DOCUMENTS

| | | | |
|---|---|---|---|
| 2,135,657 | 11/1938 | Church | 297/452.48 X |
| 3,111,345 | 11/1963 | Peras | 297/452.48 |
| 3,512,190 | 5/1970 | Buff | 297/452.48 X |
| 3,612,607 | 10/1971 | Lohr | 297/452.27 |
| 3,844,613 | 10/1974 | Waldorf | 297/452.48 |
| 4,092,751 | 6/1978 | Burkholder et al. | 297/452.278 X |
| 4,571,763 | 2/1986 | Suzuyama et al. | 297/452.27 X |
| 4,837,881 | 6/1989 | Kondo et al. | 297/452.27 X |
| 4,930,173 | 6/1990 | Woller | 297/452.48 |
| 5,283,918 | 2/1994 | Weingartner et al. | 297/452.27 |

FOREIGN PATENT DOCUMENTS

| | | |
|---|---|---|
| 59-2242 | 1/1984 | Japan . |
| 63-163654 | 10/1988 | Japan . |
| 1-161649 | 11/1989 | Japan . |
| 5-95343 | 12/1993 | Japan . |
| 5-95344 | 12/1993 | Japan . |
| 8-238141 | 9/1996 | Japan . |

*Primary Examiner*—Laurie K. Cranmer
*Attorney, Agent, or Firm*—Cushman Darby & Cushman IP Group of Pillsbury Madison & Sutro LLP

[57] ABSTRACT

A vehicle seat structure includes a seat cushion provided such that a spring constant of the seat cushion is set to be lowest at a central portion of a vehicle occupant at a hip point position of the vehicle occupant and become greater from the central portion of the vehicle occupant at the hip point position of the vehicle occupant toward vehicle transverse direction peripheries of the seat cushion.

21 Claims, 29 Drawing Sheets

F I G. 1 1
P R I O R A R T
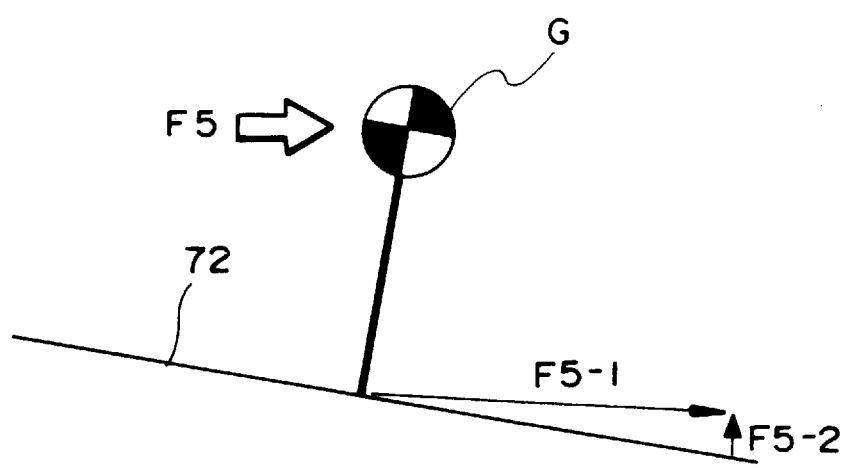

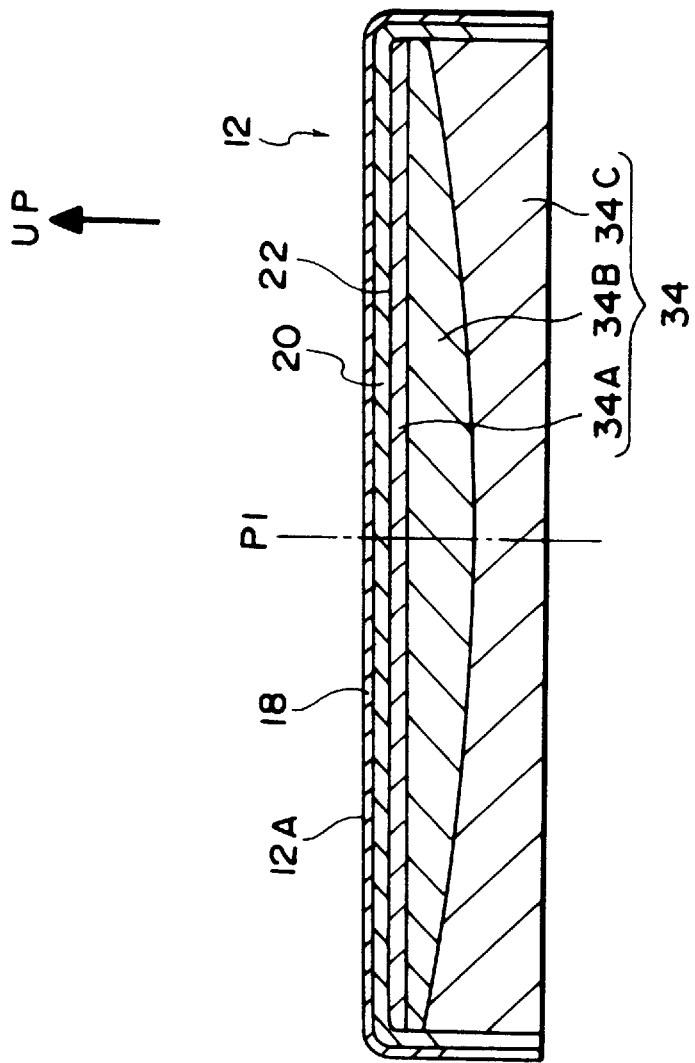

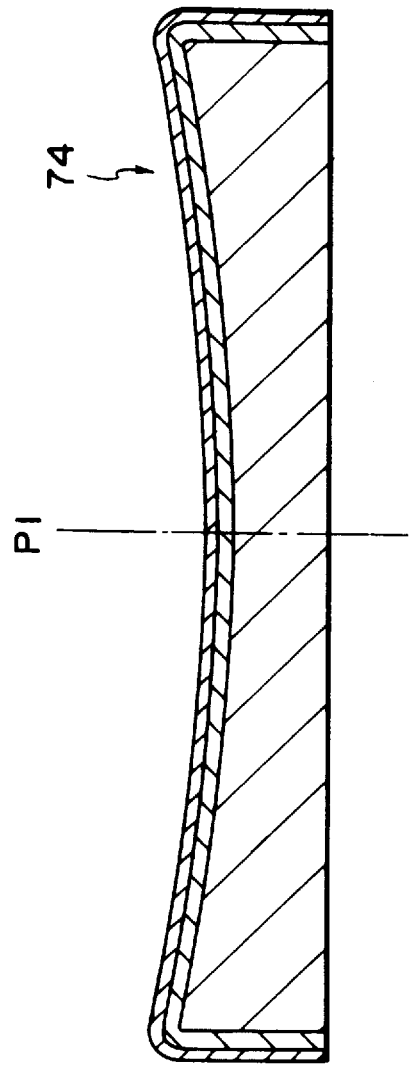

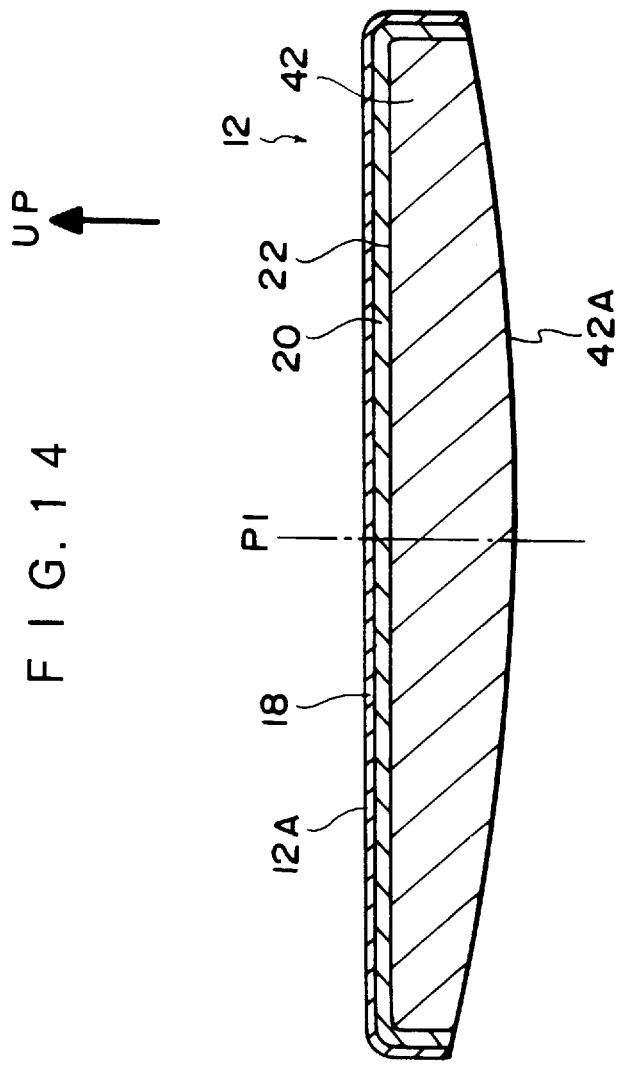

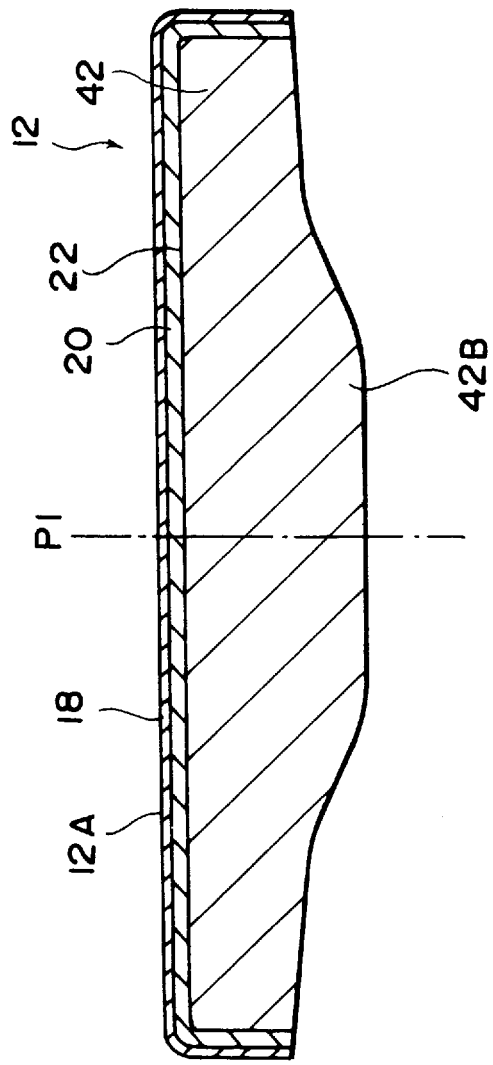

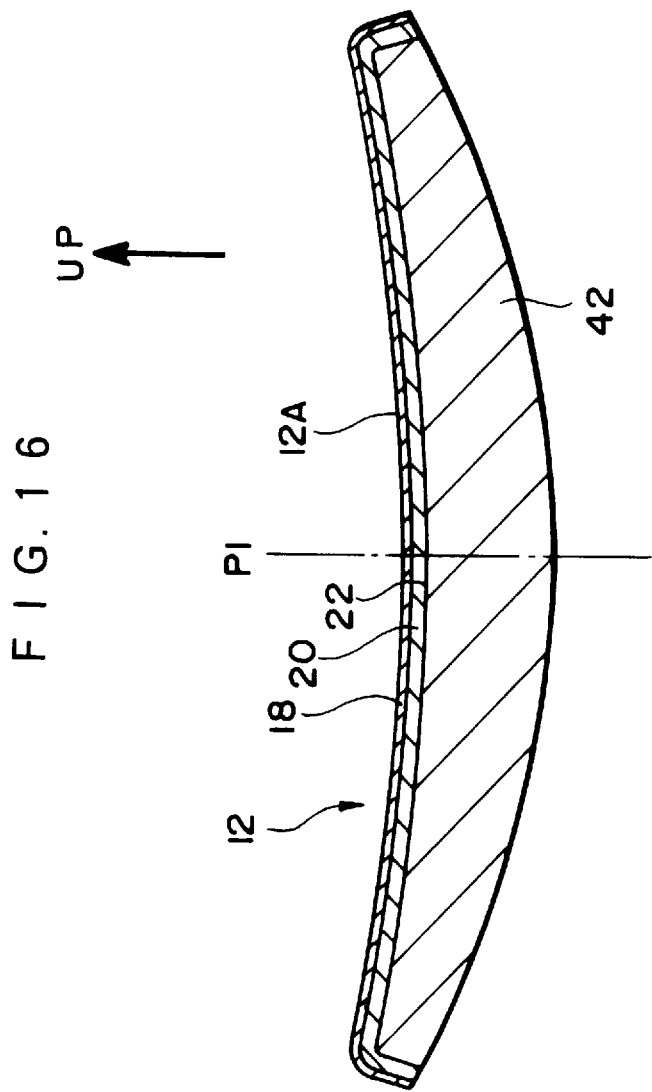

VEHICLE SEAT STRUCTURE

BACKGROUND OF THE INVENTION

1. Field of the Invention

The present invention relates to a vehicle seat structure provided in a vehicle such as an automobile.

2. Description of the Related Art

In conventional vehicle seat structures provided in vehicles such as automobiles, various attempts have been made to improve the seating comfort of the seat. For example, Japanese Utility Model Applications Laid-Open (JP-U) 5-95344 and 5-95343 disclose forming a seat cushion or a seat frame bottom portion in a curved configuration such that the portion of the seat cushion or the seat frame bottom portion directly beneath the ischium and femur region of a vehicle occupant seated thereon is higher than the other portions. JP-U 1-161649 discloses a seat cushion in which the upper surface of a hard pad layer corresponding to the maximum value of a body-pressure distribution is formed as a curved, concave surface, and a soft pad layer is formed on the hard pad layer to make the thickness of the seat cushion at the curved portion greater. JP-U 63-163654 discloses a seat having a cushion material of a single hardness, and a large number of small holes are formed in the surface of the cushion material at the seat surface covering side. JP-U 59-2242 discloses a seat cushion in which the cushion characteristics of a pad member are adjusted by forming a plurality of pinholes or notches from the outer side of the pad member toward the interior thereof.

However, conventional vehicle seat structures do not take the spring constant of the seat cushion into consideration. For example, as illustrated in FIG. 22, if the thickness of a seat cushion 70 is uniform, the spring constant of the seat cushion 70 at every portion thereof is substantially the same.

As shown in FIG. 23, a gravitational component F1 inputted to a center of gravity position G of a vehicle occupant is distributed into forces F2, F3 to positions D and E beneath the buttocks of the vehicle occupant, at which positions the greatest load is applied to the seat cushion 70, such that F2=F3. As can be seen in FIG. 24, because the spring constants at the positions D and E beneath the buttocks are equal, as shown in FIG. 23, the positions D and E beneath the buttocks are displaced downwardly by the same strokes S1, S2 due to the gravitational component F1.

Accordingly, as shown in FIG. 25, at times such as when the vehicle turns or changes lanes, a side force F4 is inputted to the center of gravity position G, and different portions of the skin of the vehicle occupant, the skin and clothes of the vehicle occupant, the clothes of the vehicle occupant and the seat surface covering, or different portions of the seat surface covering rub against each other. Therefore, the center of gravity position G moves in the same direction of the side force F4, and simultaneously, the force F2 inputted to the position D beneath a buttock decreases and the force F3 inputted to the position E beneath a buttock increases.

The position D beneath a buttock moves horizontally by a distance H1 and becomes position D1. Because the spring constant is the same at positions D and D1 as shown in FIG. 24, a stroke S3, which is the load amount by which F2 has decreased and which moves upward, is generated. The position E beneath a buttock moves horizontally by the distance H1 and becomes position E1. Because the spring constant is the same here as well, a stroke S4, which is the load amount by which F3 has increased and which moves downward, is generated. As a result, due to the resultant force of the distance H1 and the stroke S3 and the resultant force of the distance H1 and the stroke S4, the center of gravity position G moves a distance H2, and a moment M1 in the clockwise direction in FIG. 25 is generated such that the center of gravity position G is moved to center of gravity position G1.

With this seat cushion, when the vehicle turns, the body of the vehicle occupant always moves toward the outer side and tilts toward the outer side. Therefore, in order to handle this movement and tilting, the vehicle occupant must brace his/her legs or grasp a handle or the like, which may lead to the vehicle occupant becoming fatigued or the like.

Substantially the same situation arises at the seat back as well. If the gravitational component F1 in FIG. 23 is replaced by a force in the longitudinal direction of the vehicle which is generated by the vehicle occupant bracing his/her legs, the same effects occur, which also may lead to fatigue.

Working of the load in the longitudinal direction of the vehicle at the time when the vehicle brakes will be described hereinafter.

If the thickness of the portion of the seat cushion 70 beneath the vehicle occupant's buttocks is substantially the same along the longitudinal direction of the vehicle as illustrated in FIG. 22, the spring constant is the same at every portion thereof. Accordingly, if an anthropomorphic test dummy 71 is seated on the seat cushion 70 as illustrated in FIG. 26, and positions D2, E2 are set at the front and the back of a hip point P of a contact portion of the seat cushion, and the movement of the positions D2, E2 is observed, it is found that the positions D2, E2 move in substantially the same way at the time the vehicle brakes (i.e., at the time a braking force F5 is inputted to the center of gravity position G) and at the time a transverse direction force is inputted.

More specifically, due to the braking force F5, the positions D2, E2 respectively move forward by a distance H3, and the position D2 moves upward by the amount by which the load decreased at the position D2, so as to become position D3. Further, the position E2 moves downwardly by the amount by which the load increased due to the braking force, so as to become position E3. When the above movements are compounded together, the center of gravity position G2 moves forward at an upward incline to center of gravity position G3, and a moment M2 which is counterclockwise in FIG. 26 is generated. The amount of movement and the moment are added to the braking direction force F5, such that the body of the vehicle occupant is moved even further forward. A force opposing this force is generated in the vehicle occupant, which also causes fatigue on the part of the vehicle occupant.

A conventional seat cushion has been proposed in which, as illustrated in FIG. 27, the height of the urethane at the front of the seat cushion is greater so as to prevent forward movement of the body of the vehicle occupant. However, in this case, the spring constant of the urethane positioned toward the front of the vehicle is small (K4<K3<K1<K2<K5). Although the upward direction movement component of position D2 is eliminated, the downward movement of position E2 becomes larger than in the case illustrated in FIG. 26 so that as a result, substantially the same moment M2 is generated.

SUMMARY OF THE INVENTION

In view of the aforementioned, an object of the present invention is to provide a vehicle seat structure in which there is less fatigue on the part of the vehicle occupant.

A first aspect of the present invention is a vehicle seat structure comprising: a seat cushion provided such that a spring, constant of the seat cushion is set to be lowest at a central portion of a vehicle occupant at a hip point position of the vehicle occupant and become greater from the central portion of the vehicle occupant at the hip point position of the vehicle occupant toward vehicle transverse direction peripheries of the seat cushion.

A second aspect of the present invention is a vehicle seat structure in which, in the first aspect of the invention, the seat cushion is provided such that the spring constant of the seat cushion becomes greater toward vehicle longitudinal direction peripheries of the seat cushion from the central portion of the vehicle occupant at the hip point position of the vehicle occupant.

A third aspect of the present invention is a vehicle seat structure in which, in either the first or the second aspect of the invention, the seat cushion has a space forming means in a cushion material which forms a portion of the seat cushion, the space forming means adjusting the spring constant.

A fourth aspect of the present invention is a vehicle seat structure in which, in the third aspect of the invention, the space forming means is a large number of holes provided in a surface of the cushion material, and the spring constant is adjusted by at least one of depths of the holes, diameters of the holes, and density of the holes.

A fifth aspect of the present invention is a vehicle seat structure in which, in either the first or the second aspect of the invention, the spring constant of the seat cushion is adjusted by at least one of thickness and hardness of a cushion material which forms a portion of the seat cushion.

A sixth aspect of the present invention is a vehicle seat structure comprising: a seat back provided such that a spring constant of the seat back is set to be lowest at a central portion of a vehicle occupant back contacting position of the seat back and become greater from the central portion of the vehicle occupant back contacting position toward vehicle transverse direction peripheries of the seat back.

In the vehicle seat structure of the first aspect of the present invention, when a side force is inputted to the center of gravity of the vehicle occupant, the hip point moves horizontally. The spring constant of the seat cushion is set to be the lowest at the central portion of the vehicle occupant at the hip point position of the vehicle occupant (hereinafter, "vehicle occupant hip point position central portion"), and to become greater from the vehicle occupant hip point position central portion toward the vehicle transverse direction peripheries of the seat cushion. Therefore, a moment directed in the opposite direction of the side force, i.e., a moment directed toward the vehicle transverse direction center, is generated. As a result, as compared with a seat cushion having a uniform spring constant, the amount of horizontal movement of the center of gravity is small, and the moment in the same direction as the side force is small.

In the vehicle seat structure of the second aspect of the present invention, when a braking force is inputted to the center of gravity of the vehicle occupant, the hip point moves forward. The spring constant of the seat cushion is set to be lowest at the vehicle occupant hip point position central portion and become greater toward the vehicle longitudinal direction peripheries of the seat cushion from the vehicle occupant hip point position central portion. Therefore, a moment directed in a direction opposite to the braking force, i.e., a moment directed toward the rear of the vehicle, is generated. As a result, as compared with a seat cushion having a uniform spring constant, the amount of forward movement of the center of gravity is small, and the moment in the same direction as the braking force is small.

In the vehicle seat structure of the third aspect of the present invention, the spring constant of the seat cushion is adjusted by a large number of space forming means formed in a cushion material which forms a portion of the seat cushion. The spring constant of the seat cushion is set to be lowest at the vehicle occupant hip point position central portion and become greater toward the vehicle transverse direction peripheries, and is set to become greater toward the vehicle longitudinal direction peripheries from the vehicle occupant hip point position central portion. The operation is therefore the same as that of the first aspect and the second aspect.

In the vehicle seat structure of the fourth aspect, the spring constant is adjusted by at least one of the depth, diameter and density of the large number of holes formed at the surface of the cushion material located at the seat surface covering side of the cushion material. The spring constant of the seat cushion is set to be lowest at the vehicle occupant hip point position central portion and become greater toward the vehicle transverse direction peripheries, and is set to become greater toward the vehicle longitudinal direction peripheries from the vehicle occupant hip point position central portion. In this way, the operation is the same as that of the first aspect and the second aspect.

In the vehicle seat structure of the fifth aspect of the present invention, the spring constant is adjusted by the thickness and/or the hardness of the cushion material of the seat cushion. The spring constant of the seat cushion is set so as to be lowest at the vehicle occupant hip point position central portion and become greater toward the vehicle transverse direction peripheries, and is set to become greater toward the vehicle longitudinal direction peripheries from the vehicle occupant hip point position central portion. In this way, the operation is the same as that of the first and second aspects.

In the vehicle seat structure of the sixth aspect of the present invention, when a side force is inputted to the center of gravity of the vehicle occupant, the hip point moves horizontally. The spring constant of the seat back is set to be lowest at the central portion of the vehicle occupant back contacting position, and to become greater from the central portion of the back contacting position toward the vehicle transverse direction peripheries of the seat back. Therefore, a moment directed in the direction opposite to the side force, i.e., directed toward the vehicle transverse direction center, is generated. As a result, as compared to a seat back having a uniform spring constant, the amount of horizontal movement of the center of gravity is small, and the moment in the same direction as the side force is small.

In accordance with the above-described aspects of the present invention, a superior effect is achieved in that there is less fatigue on the part of the vehicle occupant. Further, excellent effects are achieved in that the holding performance is outstanding and a self-centering effect is achieved.

BRIEF DESCRIPTION OF THE DRAWINGS

FIG. 11 is a view corresponding to FIG. 10 and for explaining operation of a vehicle seat structure relating to a conventional example.

FIG. 12 is a cross-sectional view, corresponding to FIG. 2, of a vehicle seat structure relating to a second embodiment of the present invention.

FIG. 13 is cross-sectional view, corresponding to FIG. 2, of a vehicle seat structure relating to a conventional example.

FIG. 14 is a cross-sectional view, corresponding to FIG. 2, of a vehicle seat structure relating to a third embodiment of the present invention.

FIG. 15 is a cross-sectional view, corresponding to FIG. 2, of a vehicle seat structure relating to a modified example of the third embodiment of the present invention.

FIG. 16 is a cross-sectional view, corresponding to FIG. 2, of a vehicle seat structure relating to a modified example of the third embodiment of the present invention.

DESCRIPTION OF THE PREFERRED EMBODIMENTS

A first embodiment of a vehicle seat structure relating to the present invention will be described hereinafter with reference to FIGS. 1 through 11.

In the figures, the arrow FR points toward the front of the vehicle, and the arrow UP points toward the top of the vehicle.

Figure 1:
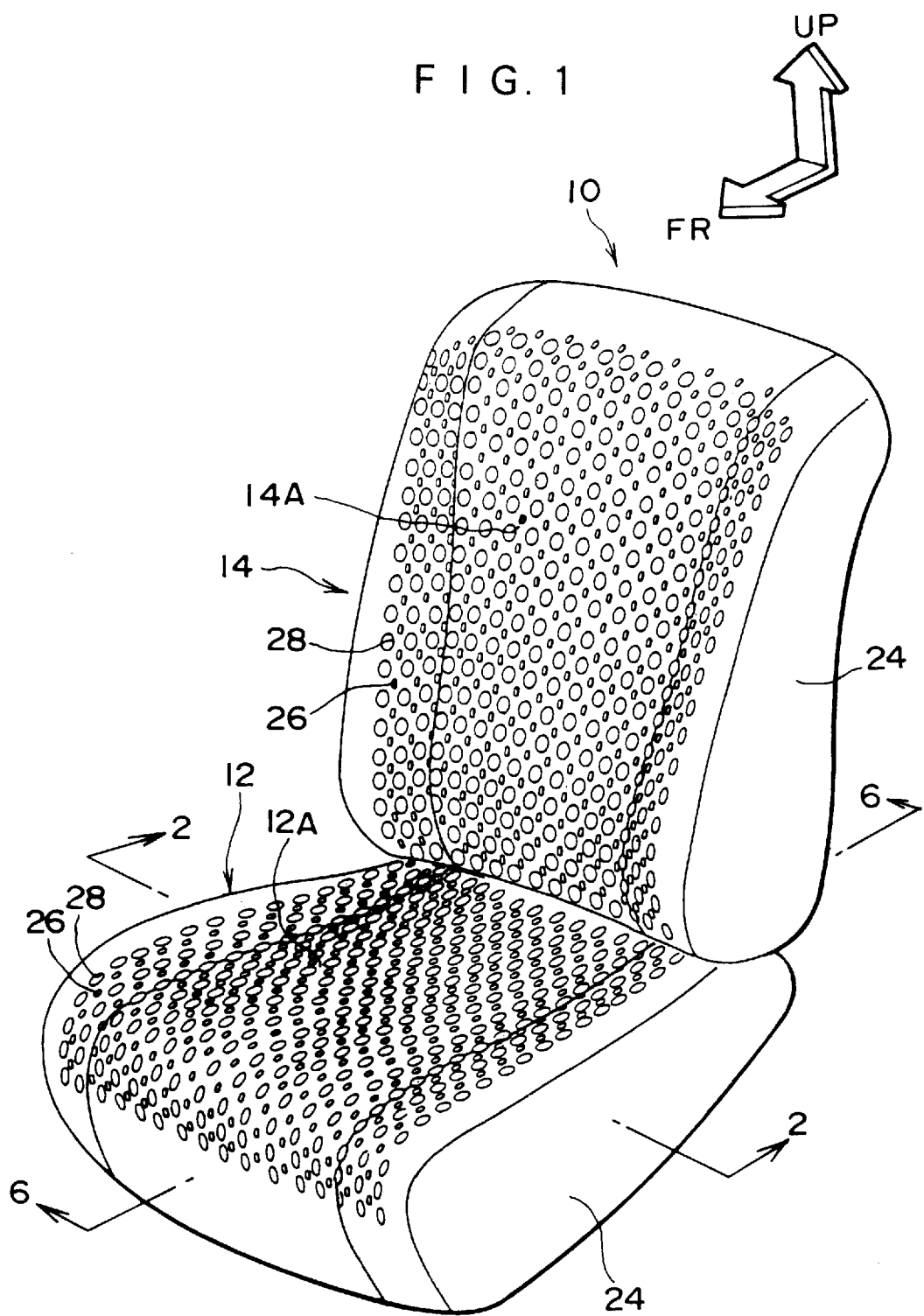
FIG. 1 is a perspective view, as viewed from the front of the vehicle and at an angle, illustrating a vehicle seat structure relating to a first embodiment of the present invention.

As illustrated in FIG. 1, a large number of small holes 26 and large holes 28 are formed in a urethane cushion 24 of a seat cushion 12 and a urethane cushion 24 of a seat back 14 of a vehicle seat 10 of the first embodiment.

Figure 2:
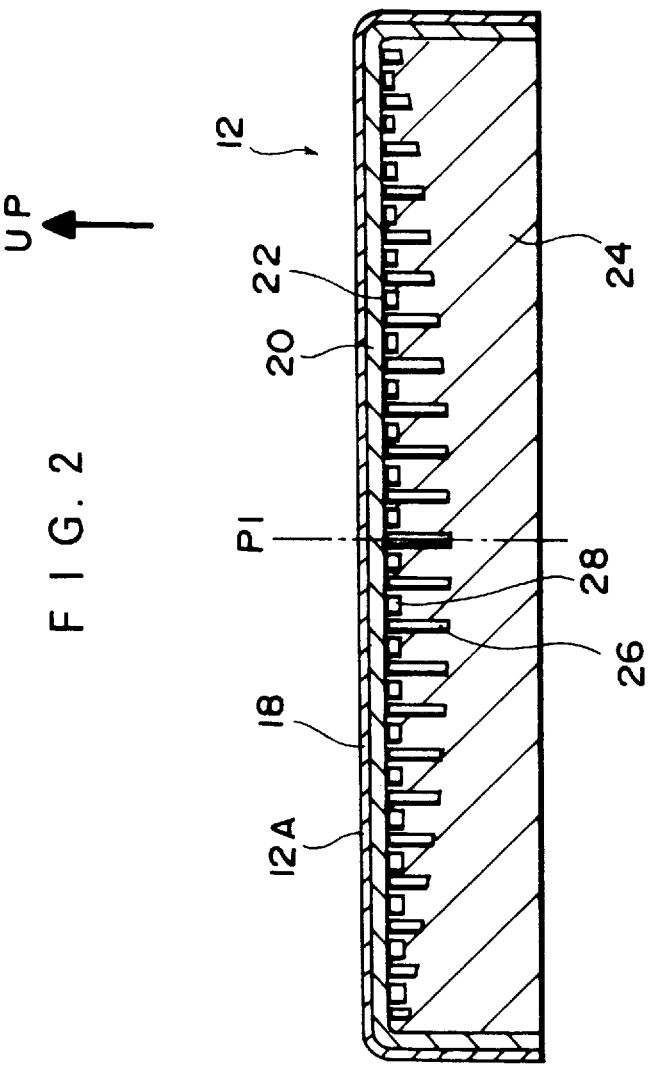
FIG. 2 is a cross-sectional view taken along line 2—2 of FIG. 1.

FIG. 2 is a vehicle transverse direction cross-sectional view of the seat cushion 12. A seat surface covering 18 of fabric, leather or the like, a thin sponge layer 20 provided at the inner side of the seat surface covering 18, and a lining 22 are formed integrally at a seating surface 12A of the seat cushion 12. The seat surface covering 18, the thin sponge layer 20, and the lining 22 are provided on the urethane cushion 24 which serves as a cushion material. Unillustrated springs are disposed beneath the urethane cushion 24, and an unillustrated seat cushion plate is disposed beneath the springs.

The many small holes 26 and large holes 28, which serve as space forming means, are alternately formed in a surface of the urethane cushion 24 such that the depth direction of the holes is the vertical direction of the vehicle, i.e., the holes are deep toward the bottom of the vehicle. The large holes 28 are less deep than the small holes 26, and are formed to uniform depths. However, the small holes 26 are formed such that the small hole 26 at a central portion P1 of the vehicle occupant at the hip point position of the vehicle occupant is the deepest, and the small holes 26 become less deep toward the vehicle transverse direction peripheries of the seat cushion 12. (Here, "the central portion of the vehicle occupant at the hip point position of the vehicle occupant" and its abbreviated form "vehicle occupant hip point position central portion" are intended to mean that portion located at the hip point position of the vehicle occupant and at the substantial widthwise direction center of the vehicle occupant.)

In a case in which the material and the thickness of the urethane cushion 24 are uniform, the spring constant of the urethane cushion 24 decreases as the amount of space increases. Therefore, as shown by the solid line in FIG. 3, the spring constant of the seating surface 12A of the seat cushion 12 is lowest at the vehicle occupant hip point position central portion P1, and gradually becomes greater toward the vehicle transverse direction peripheries of the seat cushion 12.

Figure 6:
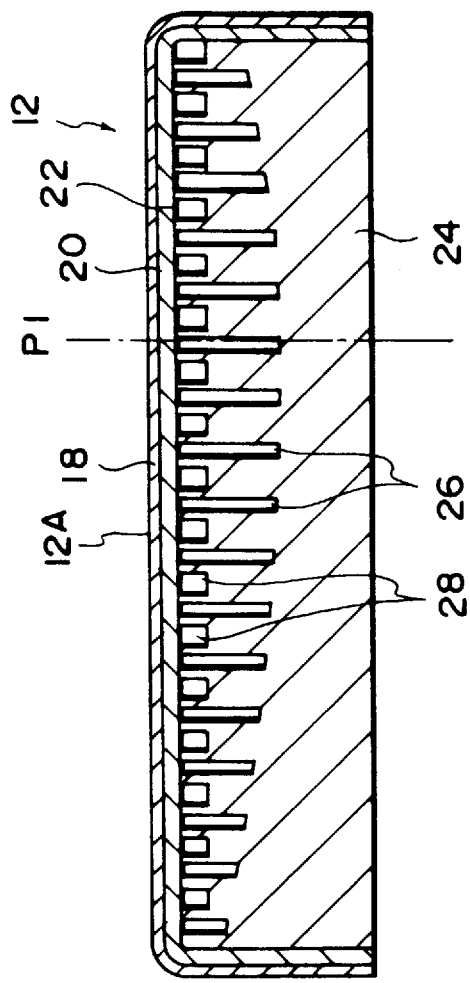
FIG. 6 is a cross-sectional view taken along line 6—6 of FIG. 1.
Figure 7:
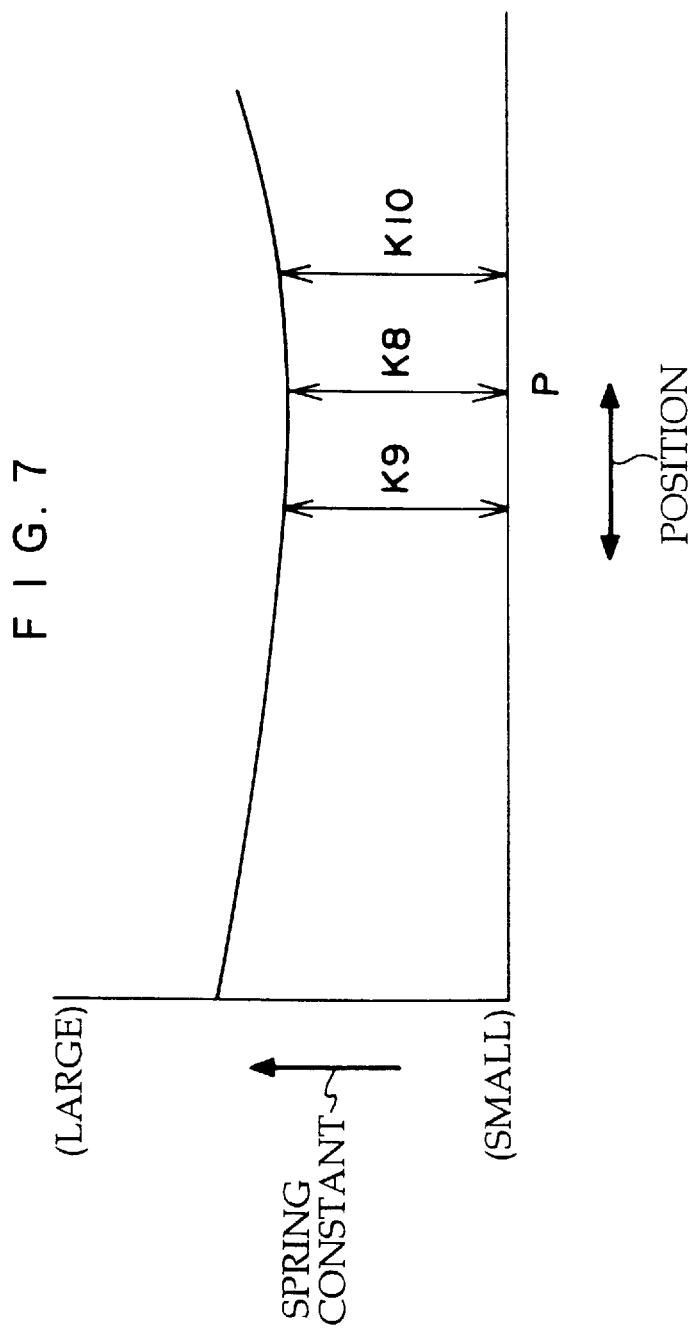
FIG. 7 is a graph illustrating a spring constant characteristic, for explaining operation of the vehicle seat structure relating to the first embodiment of the present invention.

FIG. 6 is a vehicle longitudinal direction cross-sectional view of the seat cushion 12. The small hole 26 at the vehicle occupant hip point position central portion P1 is the deepest, and the small holes 26 become less deep toward the vehicle longitudinal direction peripheries of the seat cushion 12. Therefore, as shown by the solid line in FIG. 7, at the seating surface 12A of the seat cushion 12, the spring constant K8 of the vehicle occupant hip point position central portion P1 is the lowest, and the spring constant gradually becomes greater toward the vehicle longitudinal direction peripheries of the seat cushion 12. The spring constant K9 at a portion of the seat cushion 12 at the vehicle front side of the central portion P1 and the spring constant K10 at a portion of the seat cushion 12 at the vehicle rear side of the central portion P1 are higher than the spring constant K8.

Next, operation of the present first embodiment will be described.

Figure 4:
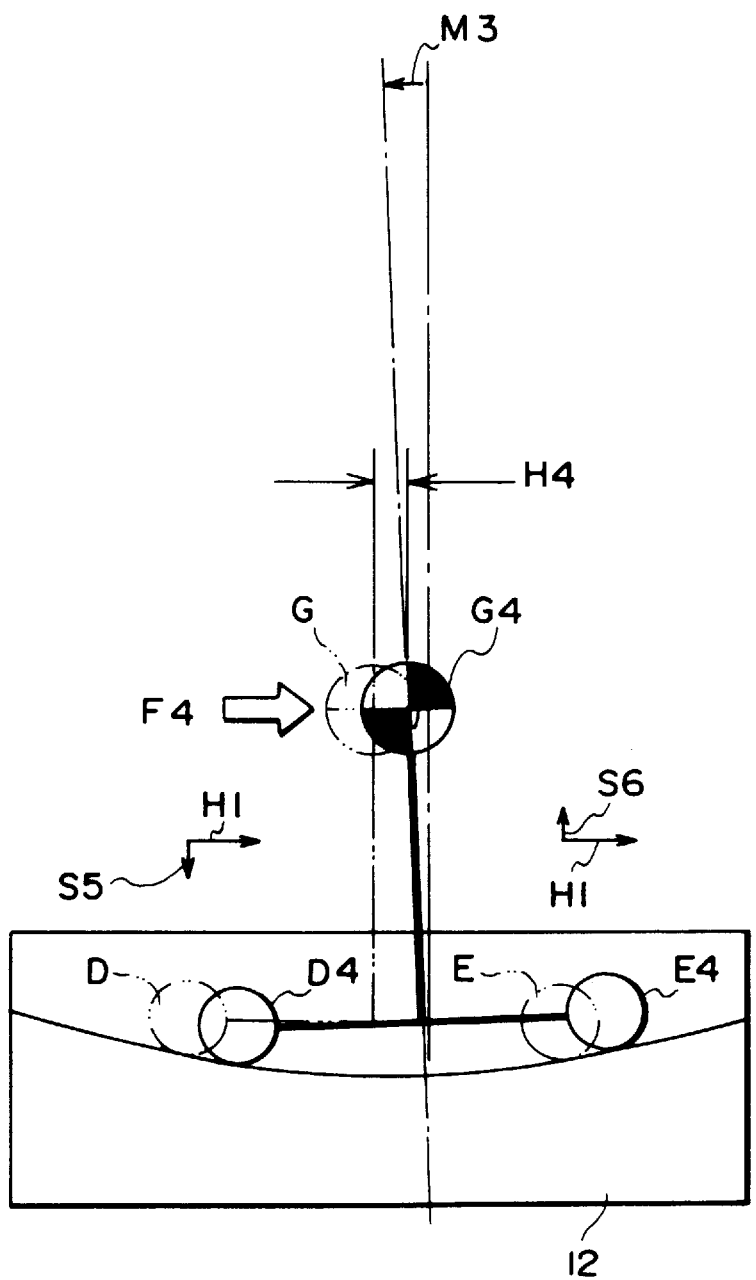
FIG. 4 is a view for explaining operation in a case in which a side force inputted to the vehicle seat structure relating to the first embodiment of the present invention.
Figure 5:
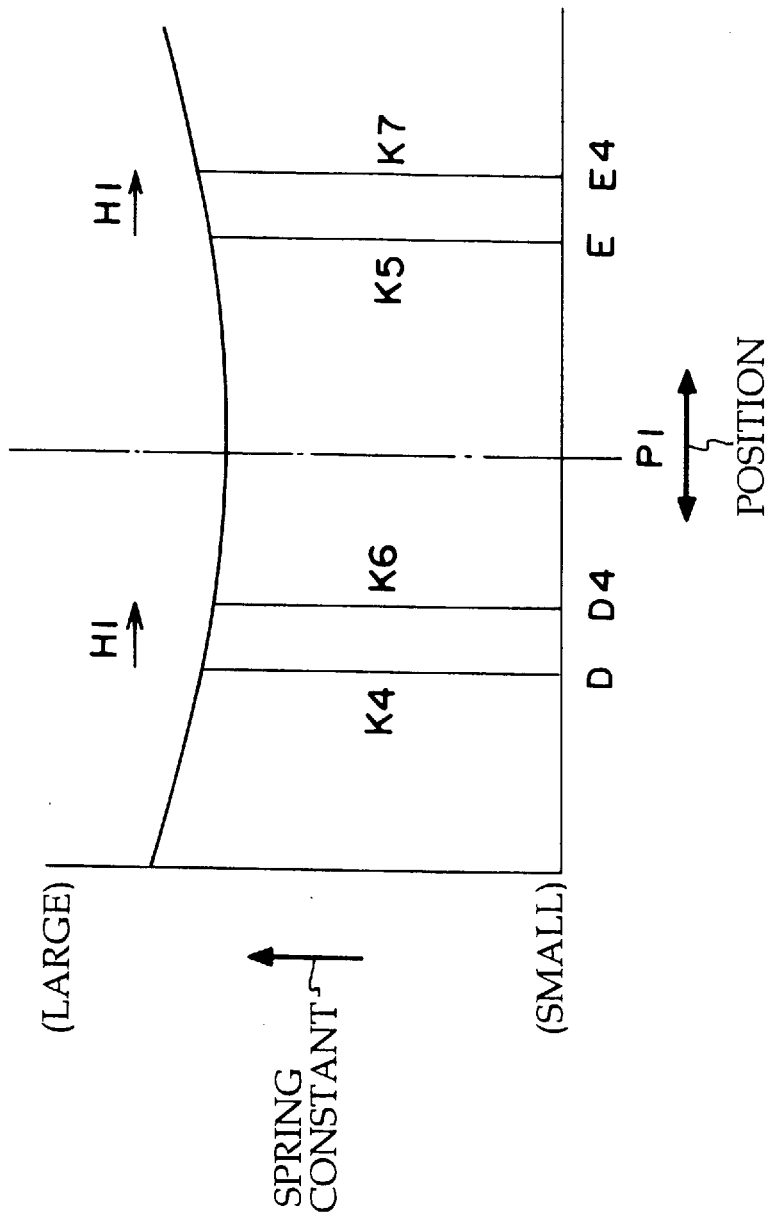
FIG. 5 is a graph illustrating a spring constant characteristic, for explaining operation of the vehicle seat structure relating to the first embodiment of the present invention.

As illustrated in FIGS. 4 and 5, when a side force is applied to a vehicle occupant seated on the seat cushion 12, of the positions D and E beneath the buttocks of the vehicle occupant, at which positions the most load is inputted due to the gravitational component inputted to the center of gravity position G of the vehicle occupant, the position D is a position at which the spring constant is K4, and the position E is a position at which the spring constant is K5. Here, equal loads are inputted to positions D and E beneath the buttocks due to the gravitational component inputted to the center of gravity position G of the vehicle occupant. Because the spring constant K4 and the spring constant K5 are equal, the positions D and E beneath the buttocks move downward by the same stroke.

In this state, when a side force F4 is inputted to the center of gravity position G of the vehicle occupant, a horizontal movement amount H1 is generated such that the position D moves to the position D4 and the position E moves to the position E4.

Because the spring constant K6 of the position D4 is lower than the spring constant K4 of the position D, the stroke S5 moves downward due to the movement of position D to position D4. Further, because the spring constant K7 of the position E4 is greater than the spring constant K5 of the position E, the stroke S6 moves upward due to the movement of position E to E4.

Accordingly, the center of gravity position G of the vehicle occupant moves the distance H4 to G4, and a moment M3 in the counterclockwise direction in FIG. 4 is generated.

The above-described operation occurs at the seat back 14 in the same way. Further, the above motion is the same as the movement when a motor boat turns, and is a way of moving in which the fulcrum of rotation is in space, i.e., the so-called sky-hook theory. The load applied to the body of the vehicle occupant is reduced, which is helpful in preventing fatigue on the part of the vehicle occupant.

Next, operation in a case in which longitudinal direction load is applied, such as when the vehicle brakes or the like, will be described.

Figure 8:
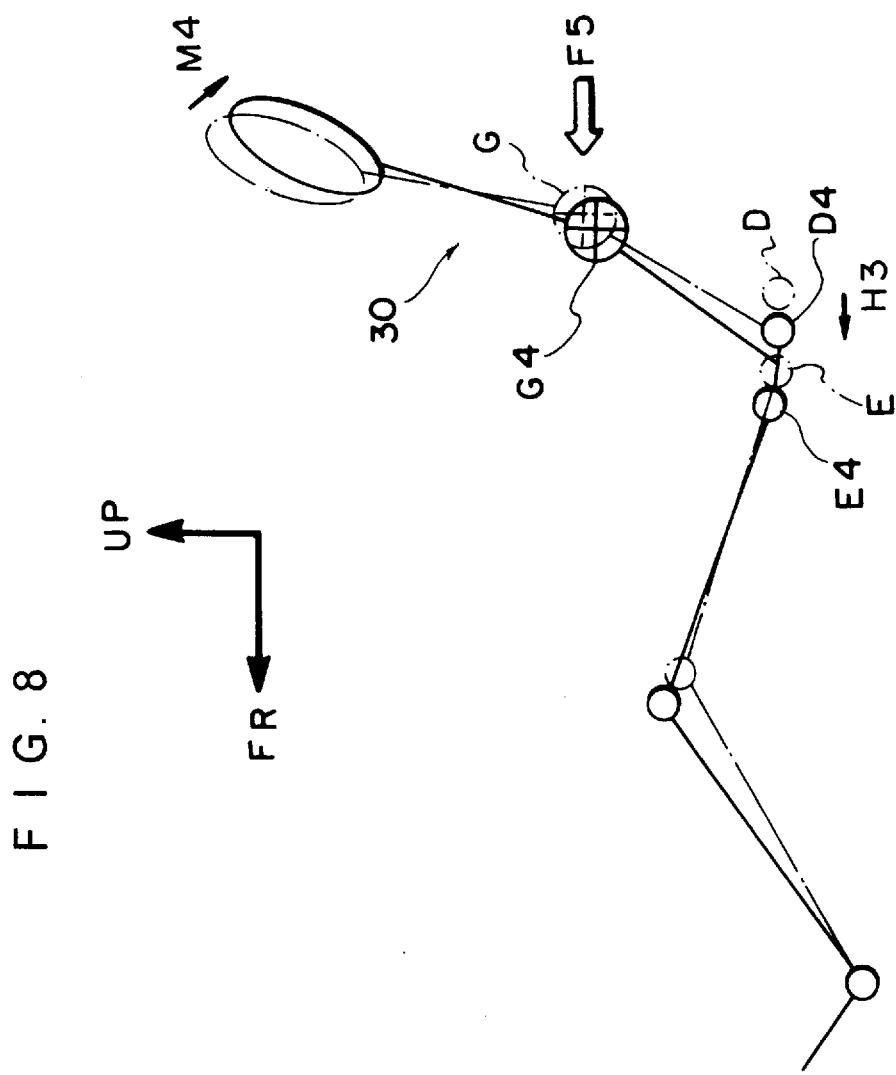
FIG. 8 is a view for explaining operation in a case in which a braking force is applied to the vehicle seat structure relating to the first embodiment of the present invention.

As illustrated in FIG. 8, when an anthropomorphic test dummy 30 is seated on the seat cushion of the first embodiment, during braking, a braking force F5 is inputted to the center of gravity position G. The anthropomorphic test dummy 30 moves in substantially the same way as a case in which widthwise direction force is inputted.

More specifically, the positions D, E are respectively moved forward by a distance H3 and become the positions D4, E4. Because the spring constant of position D4 is less than the spring constant of position D, position D4 moves downward. Because the spring constant of position E4 is greater than the spring constant of position E, position E4 moves upward. When the above-described movements are compounded, the center of gravity position G moves forward at a downward incline to the center of gravity position G4, and a moment M4 in the clockwise direction in FIG. 8 is generated. Because this amount of movement and moment M4 work to oppose the force F5 in the braking direction, the load applied to the body of the vehicle occupant is reduced, which is useful in preventing fatigue on the part of the vehicle occupant.

Figure 9:
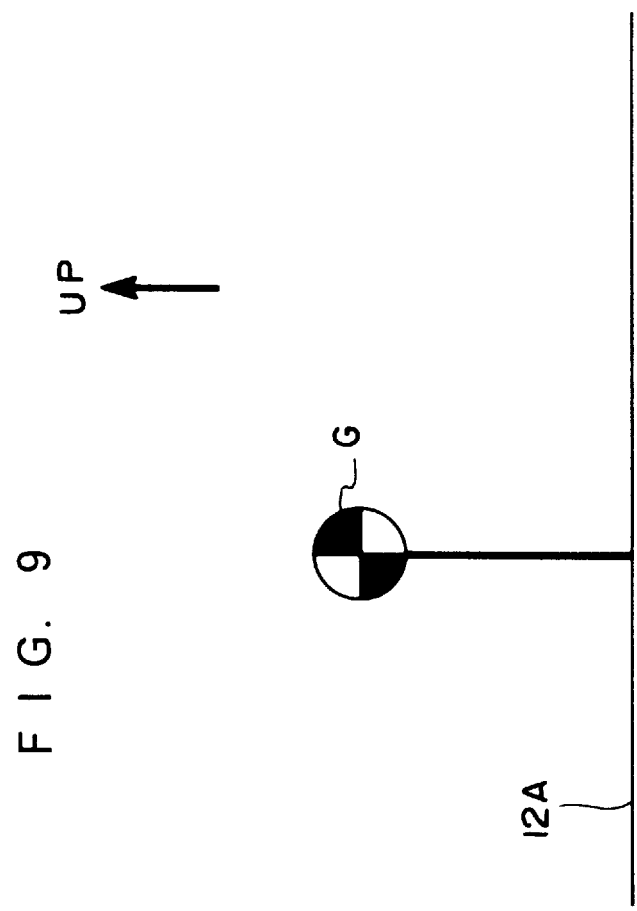
FIG. 9 is a view for explaining operation in a case in which a braking force or the like is applied to the vehicle seat structure relating to the first embodiment of the present invention.
Figure 10:
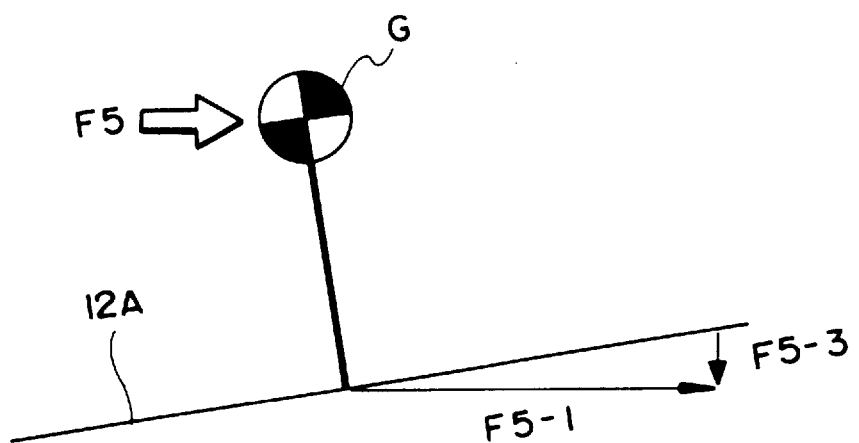
FIG. 10 is a view for explaining operation in a case in which a braking force is applied to the vehicle seat structure relating to the first embodiment of the present invention.

In the first embodiment, as illustrated in FIG. 9, in a case in which no braking force or the like is applied to the vehicle occupant seated on the seat, the seating surface 12A of the seat cushion 12 is substantially horizontal, and the center of gravity position G is not tilted. In this state, as illustrated in FIG. 10, if the braking force F5 is inputted to the center of gravity position G, as illustrated in FIG. 8, the positions D4, E4 tilt in the counterclockwise direction, and therefore, the seating surface 12A of the seat cushion 12 which contacts the positions D4, E4 also tilts. Because a horizontal component F5–1 works against this tilting, a component F5–3 in the direction of entering into the seat is generated. The vehicle occupant is thereby pushed against the seat.

Figure 26:
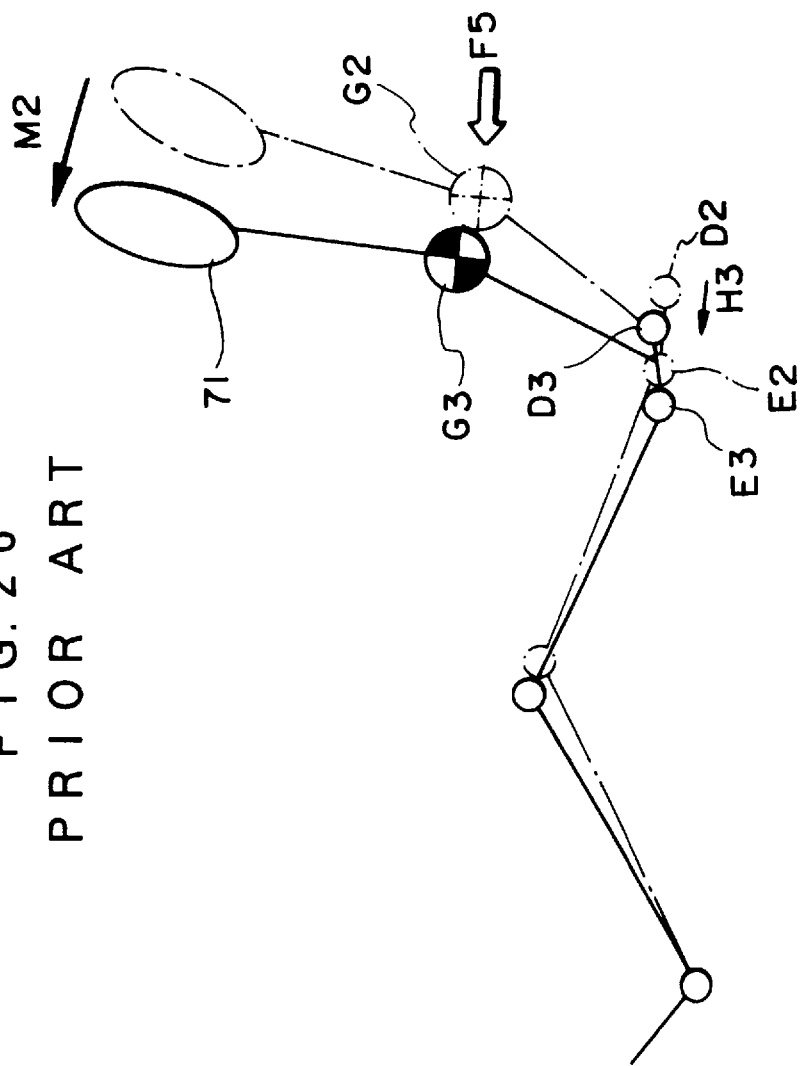
FIG. 26 is a view for explaining operation in a case in which braking force is applied to a vehicle seat structure relating to a conventional example.
Figure 27:
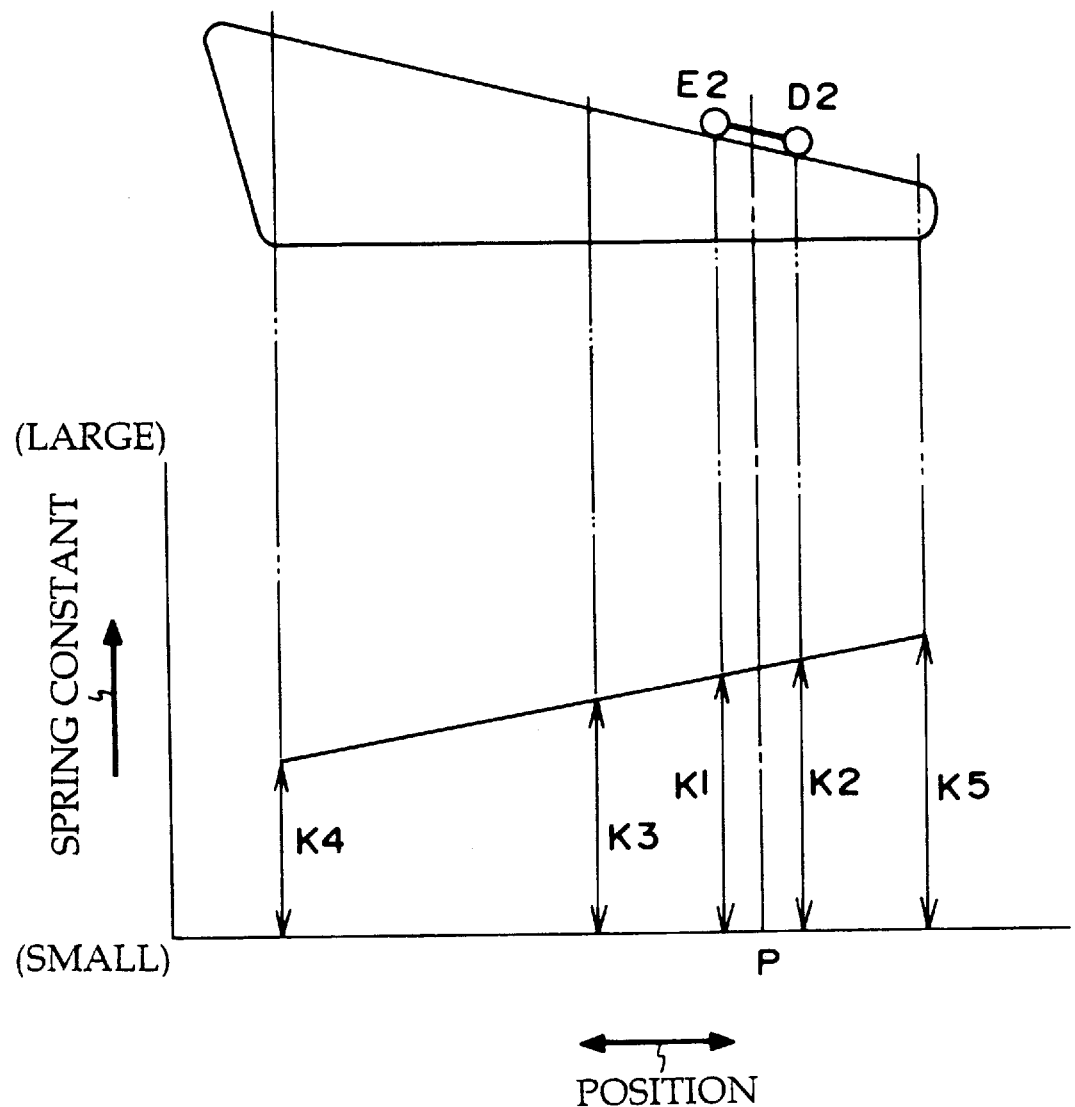
FIG. 27 is a graph illustrating the relationship between spring constants and longitudinal direction positions of a seat cushion of a vehicle seat structure relating to a conventional example.

In a conventional seat, as illustrated in FIG. 26, the positions D3, E3 tilt in the clockwise direction. Therefore, as illustrated in FIG. 11, a seating surface 72 of the seat cushion contacting these positions D3, E3 also tilts. Because the horizontal component F5–1 works against the tilted seating surface 72, a component F5–2 in a direction of separating from the seating surface 72 is generated.

The above-described operation of the first embodiment of the present invention occurs similarly in the seat back 14 and in the longitudinal directions and transverse directions as well. When braking force, acceleration or the like is applied to the vehicle occupant, in a conventional seat, the occupant moves out of the seat. However, in the seat 10 of the present first embodiment, a the vehicle occupant moves into the seat 10, and an excellent occupant holding ability is exhibited by the seat 10.

Next, self-centering operation of the seat will be described.

Figure 3:
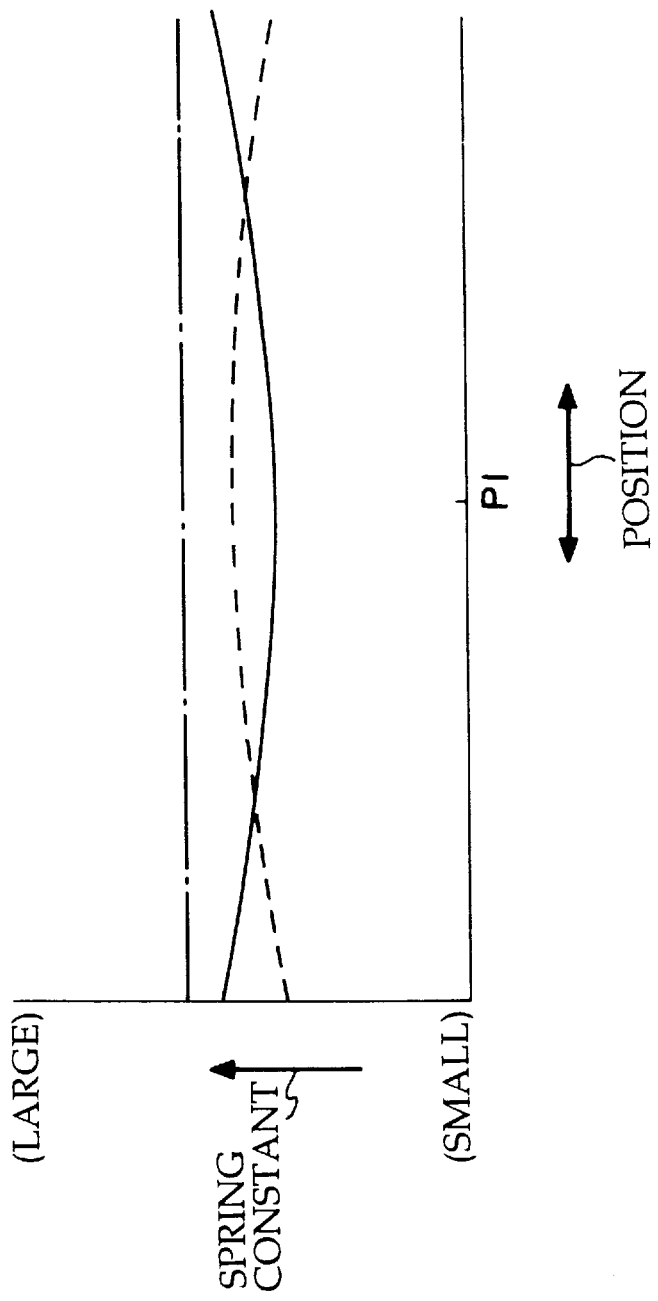
FIG. 3 is a graph illustrating the relationship between seat cushion portions and spring constants.

As illustrated by the one-dot chain line in FIG. 3, in a conventional seat, the spring constant is the same at every position of the seating surface. Therefore, when a vertical direction load is applied to the vehicle occupant, even if the vehicle occupant moves vertically, no component of force which moves in the transverse directions is generated. Namely, the vehicle occupant remains in the position he/she was in when first seated, and naturally does not move. This shows that, although an optimum position of the seat is hypothesized and set, if the vehicle occupant does not sit in this set position, he/she will remain in the out-of-place position and will not naturally move to the optimum position. Further, if the vehicle occupant shifts from the optimum position, an optimum value of the distribution of the pressure applied to the vehicle occupant cannot be obtained, and the vehicle occupant may feel an unpleasant sensation or an unsteady sensation, which contribute to the vehicle occupant becoming easily fatigued.

In contrast, in the first embodiment of the present invention, as illustrated in FIGS. 4 and 5, when, for example, a vehicle occupant sits at the positions D4, E4 which are shifted with respect to the optimum positions D, E, vertical direction load is continually inputted while the vehicle is traveling. As a result, the vehicle occupant moves up and down. This means that upward and downward loads are inputted to the positions D4 and E4 in FIG. 4. When a vertical load is inputted to the position E4, force working in a direction of sliding the vehicle occupant down into a low spring constant region, i.e., a side force, is generated because the spring constant characteristic curve has a slope as shown in FIG. 5. Further, because the position D4 and the position E4 are both positions beneath the buttocks to which the greatest loads are applied due to the gravitational component inputted to the center of gravity position G of the vehicle occupant, the positions D4, E4 move in directions of settling in at positions of equal heights, i.e., positions of equal spring constants. More specifically, due to the positions D4, E4 being shaken vertically, the positions D4, E4 settle into the optimum positions D, E. The seat thereby exhibits a self-centering function.

The self-centering function is the same with respect to the longitudinal direction of the vehicle as well. In the first embodiment, due to vertical direction load, the hip point position of the vehicle occupant naturally moves to the optimum position and settles in thereat.

Next, a second embodiment of the vehicle seat structure of the present invention will be described with reference to FIG. 12. Members which are the same as those of the first embodiment are denoted by the same reference numerals, and description thereof is omitted.

As illustrated in FIG. 12, in the seat cushion 12 of the seat of the second embodiment, a urethane cushion 34 is formed in three layers in the thickness direction thereof. The spring constants of upper layer 34A and lower layer 34C are greater than the spring constant of intermediate layer 34B. Although the thickness of the urethane cushion 34 is uniform, the thickness of the intermediate layer 34B is greatest at the vehicle occupant hip point position central portion P1, and becomes smaller toward the vehicle transverse direction peripheries of the seat cushion 12. As a result, the spring constant characteristic of the seat of the second embodiment is as illustrated by the solid line in FIG. 3, and the same effects as those of the seat of the first embodiment are obtained.

The one-dot chain line in FIG. 3 illustrates the spring constant of a conventional seat having the same thickness. The dashed line in FIG. 3 represents the spring constant of the conventional seat cushion 74 in which both transverse direction ends are made higher as shown in FIG. 13 in an attempt to stop the sliding of the vehicle occupant. However, with the seat cushion 74, the more side force is applied, the more the vehicle occupant moves, and a moment in a direction of promoting the working of the side force is generated. Therefore, the vehicle occupant not only moves apart from the seat cushion 74, but also rapidly slides further away from the optimum position.

A third embodiment of the vehicle seat structure of the present invention will now be described in accordance with FIG. 14. Members which are the same as those of the first embodiment are denoted by the same reference numerals, and description thereof is omitted.

As illustrated in FIG. 14, in the seat cushion 12 of the seat of the third embodiment, a bottom surface 42A of a urethane cushion 42 is formed as a curved surface so that the urethane cushion 42 is thickest at the vehicle occupant hip point position central portion P1 and becomes thinner toward the vehicle transverse direction peripheries of the seat cushion 12. As a result, the spring constant characteristic of the seat of the third embodiment is as illustrated by the solid line in FIG. 3, and the same effects as those of the seat of the first embodiment are obtained.

As illustrated in FIG. 15, even if the thickness of the urethane cushion 42 in a vicinity 42B of the vehicle occupant hip point position central portion P1 is great, the spring constant characteristic is substantially like the solid line in FIG. 3. Moreover, as shown in FIG. 16, even if both transverse direction ends of the seating surface 12A of the seat cushion 12 are made high so as to combine the structure of the present invention with a structure which aims to stop sliding of the vehicle occupant, the spring constant characteristic is substantially like the solid line in FIG. 3.

A fourth embodiment of the vehicle seat structure of the present invention will now be described in accordance with FIG. 17.

Figure 17:
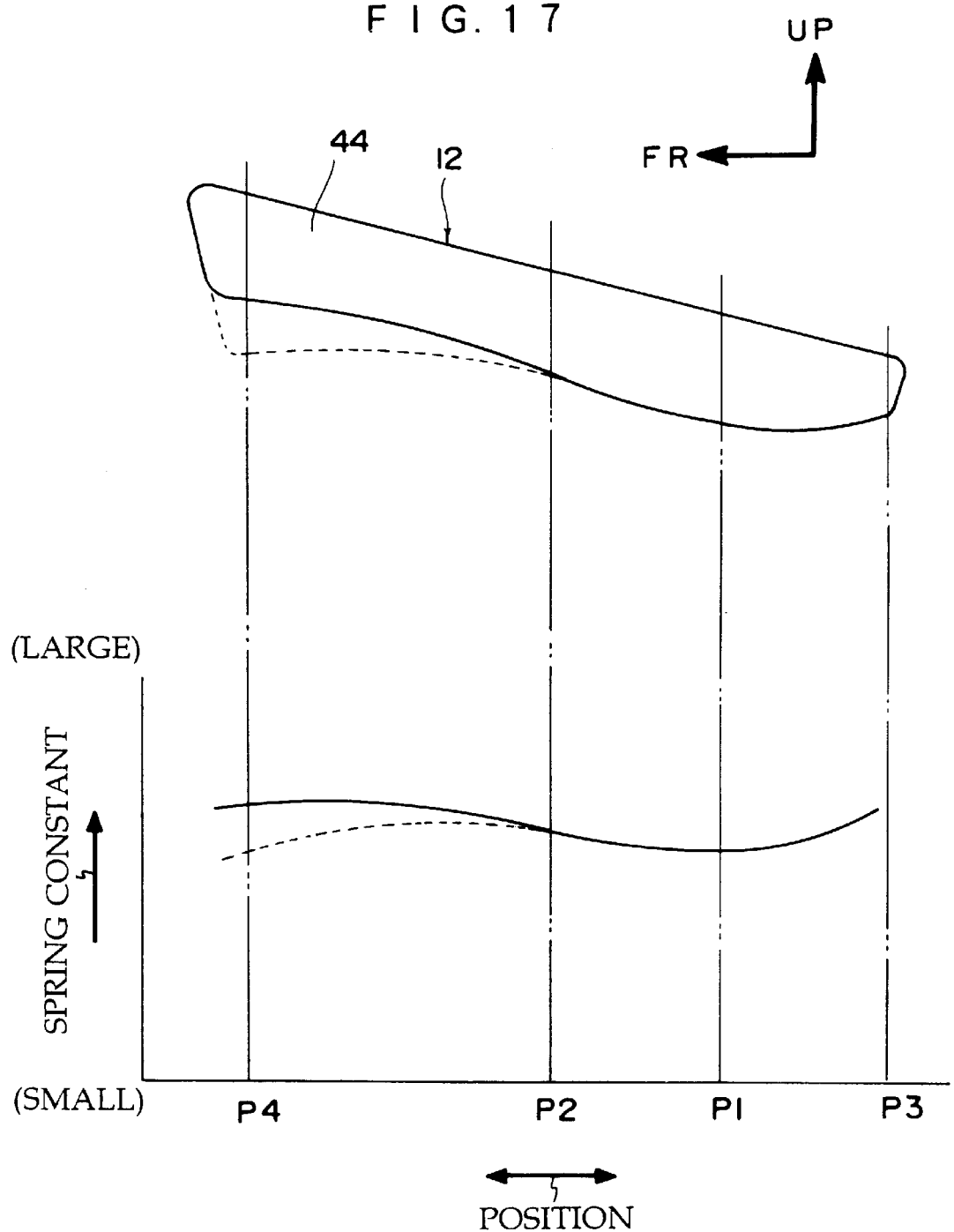
FIG. 17 is a graph illustrating the relationship between spring constants and vehicle longitudinal direction positions of a seat cushion of a vehicle seat structure relating to a fourth embodiment of the present invention.

As illustrated in FIG. 17, in the present fourth embodiment, the thickness of the seat cushion 12 along the longitudinal direction of the vehicle is varied so as to improve the spring constants in the longitudinal direction of the vehicle. The thickness of a urethane cushion 44 is as illustrated in the figure. The region between positions P2 and P3 is the range which receives the majority of the load of the vehicle occupant. Accordingly, even if the urethane cushion 44 is made thick at a region of the seat cushion 12 outside of the range between positions P2 and P3 (e.g., the region between positions P2 and P4) and the spring constant characteristic is lowered as shown from the solid line to the dashed line in FIG. 17, a high spring constant state can substantially be ensured because the input load is small and light.

Figure 18:
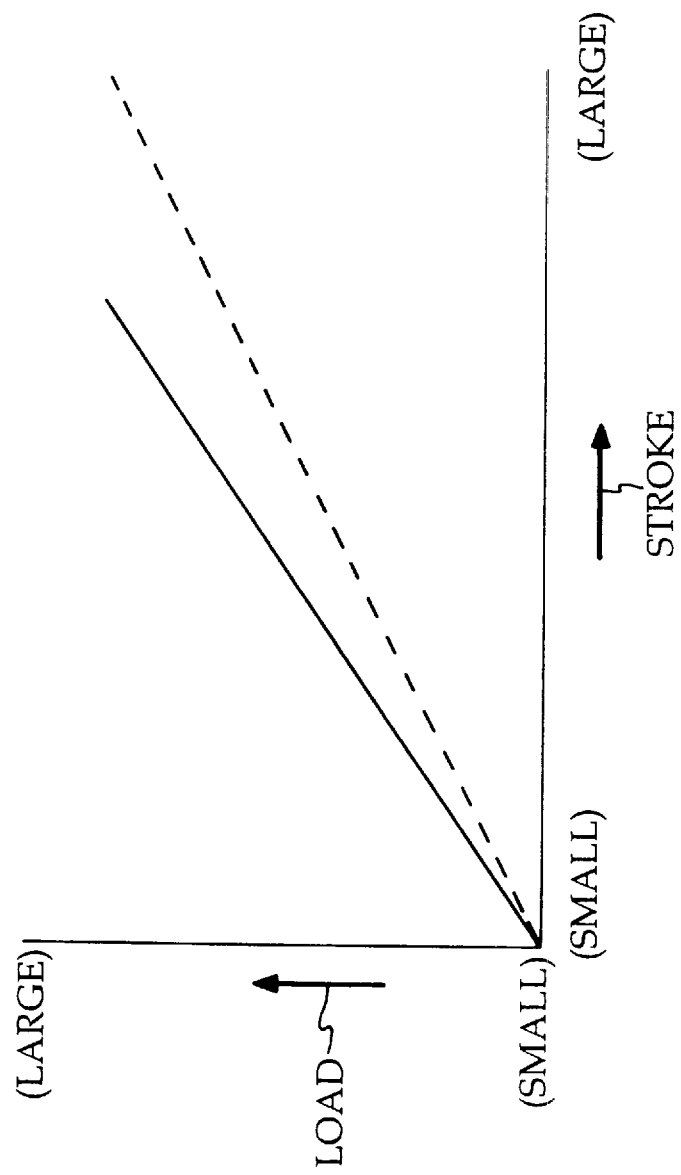
FIG. 18 is a graph illustrating a load-stroke characteristic of the vehicle seat structure relating to the fourth embodiment of the present invention.

In a case such as that of the present fourth embodiment in which the thickness of the urethane cushion is varied, the load-stroke characteristic in the range in which the spring constant is low, i.e., in a vicinity of the vehicle occupant hip point position central portion P1, is as shown by the dashed line in FIG. 18. Further, the load-stroke characteristic in the range in which the spring constant is high, i.e., at the peripheral portions, is as illustrated by the solid line in FIG. 18, which has a greater slope than that of the dashed line.

Figure 19:
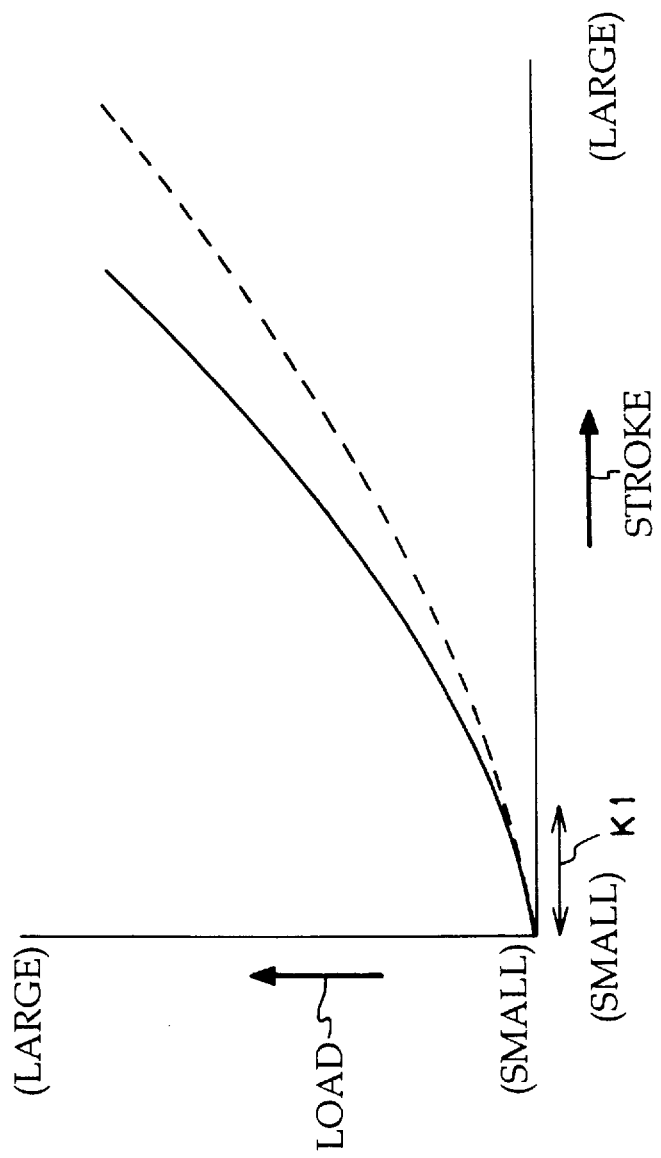
FIG. 19 is a graph illustrating a load-stroke characteristic of the vehicle seat structure relating to the first embodiment of the present invention.
Figure 20:
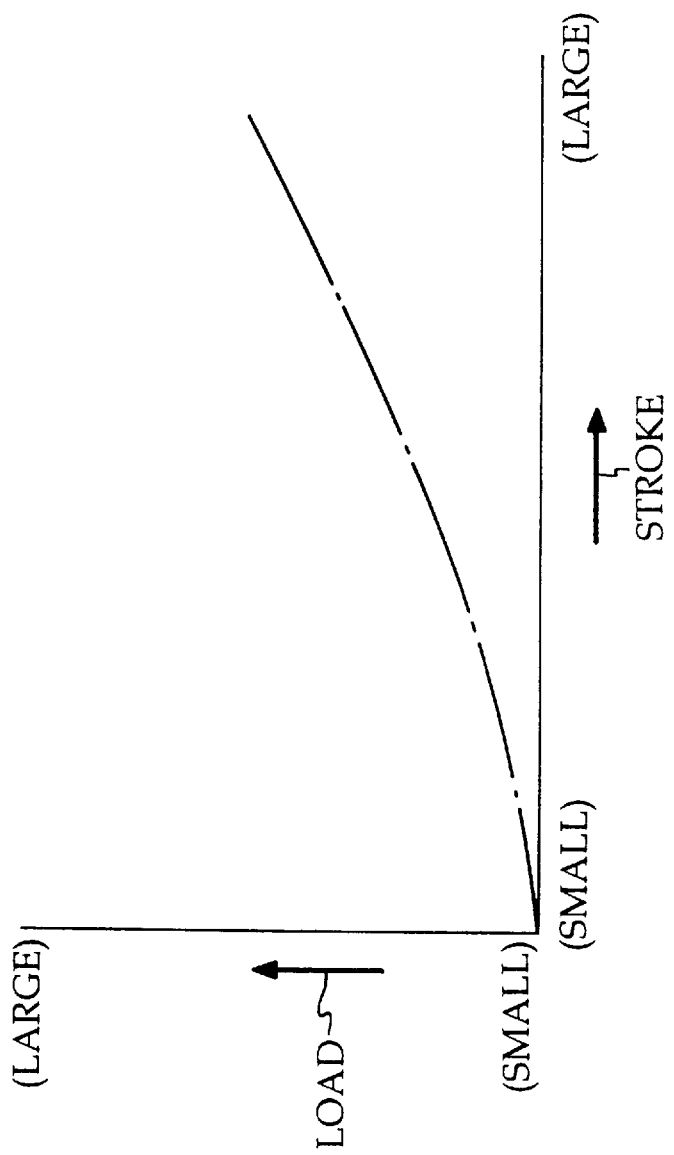
FIG. 20 is a graph which is an enlarged portion of FIG. 19 and which illustrates the load-stroke characteristic.

If holes are formed in the urethane cushion as in the first embodiment (see FIG. 1), the load-stroke characteristic in the range in which the spring constant is low, i.e., in a vicinity of the vehicle occupant hip point position central portion P1, becomes a curve such as that illustrated by the dashed line in FIG. 19. The load-stroke characteristic in the range in which the spring constant is high, i.e., at the peripheral portions, becomes a curve such as that illustrated by the solid line in FIG. 19. In particular, in the region of the solid line in FIG. 19 at which the stroke is short (K1 in FIG. 19), because the increase in the load is gradual as illustrated by the one-dot chain line in FIG. 20, the fitting performance is good. Further, because the load increases in a second-degree parabolic configuration with respect to the increase in the stroke, the fitting performance when small loads are applied is ensured, and an antinomic effect of preventing bottoming when large loads are applied is also achieved.

Figure 21:
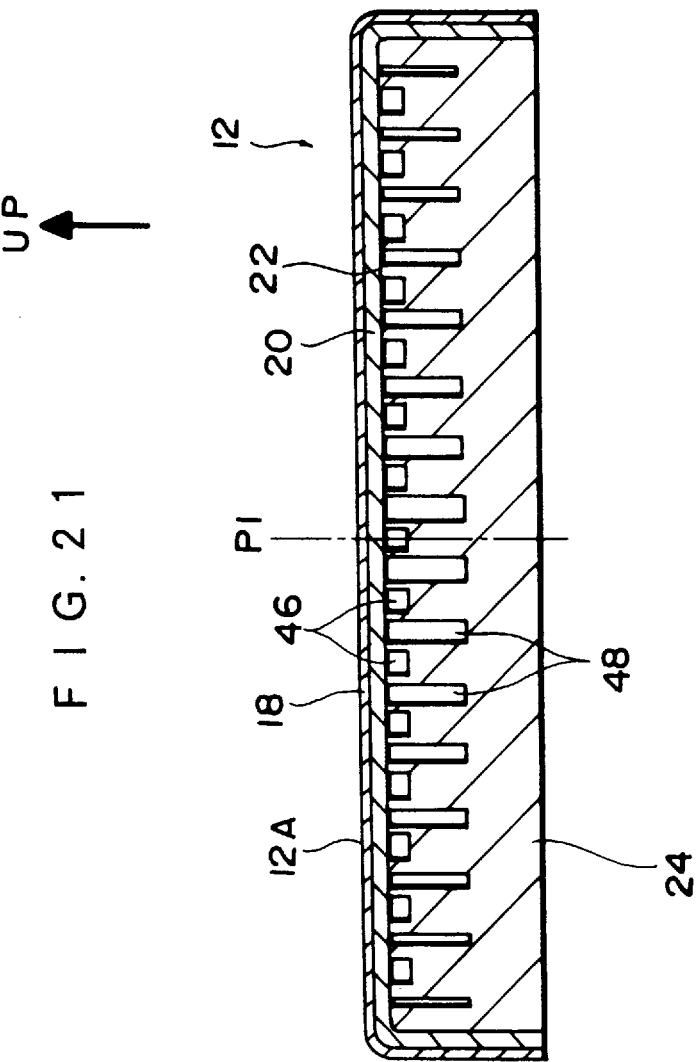
FIG. 21 is a cross-sectional view, corresponding to FIG. 2, of a vehicle seat structure relating to a modified example of the first embodiment.
Figure 22:
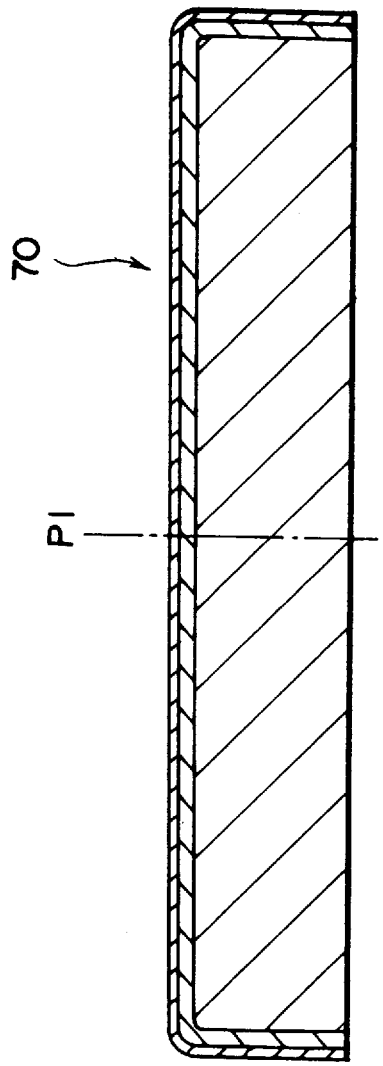
FIG. 22 is a cross-sectional view, corresponding to FIG. 2, of a vehicle seat structure relating to a conventional example.
Figure 23:
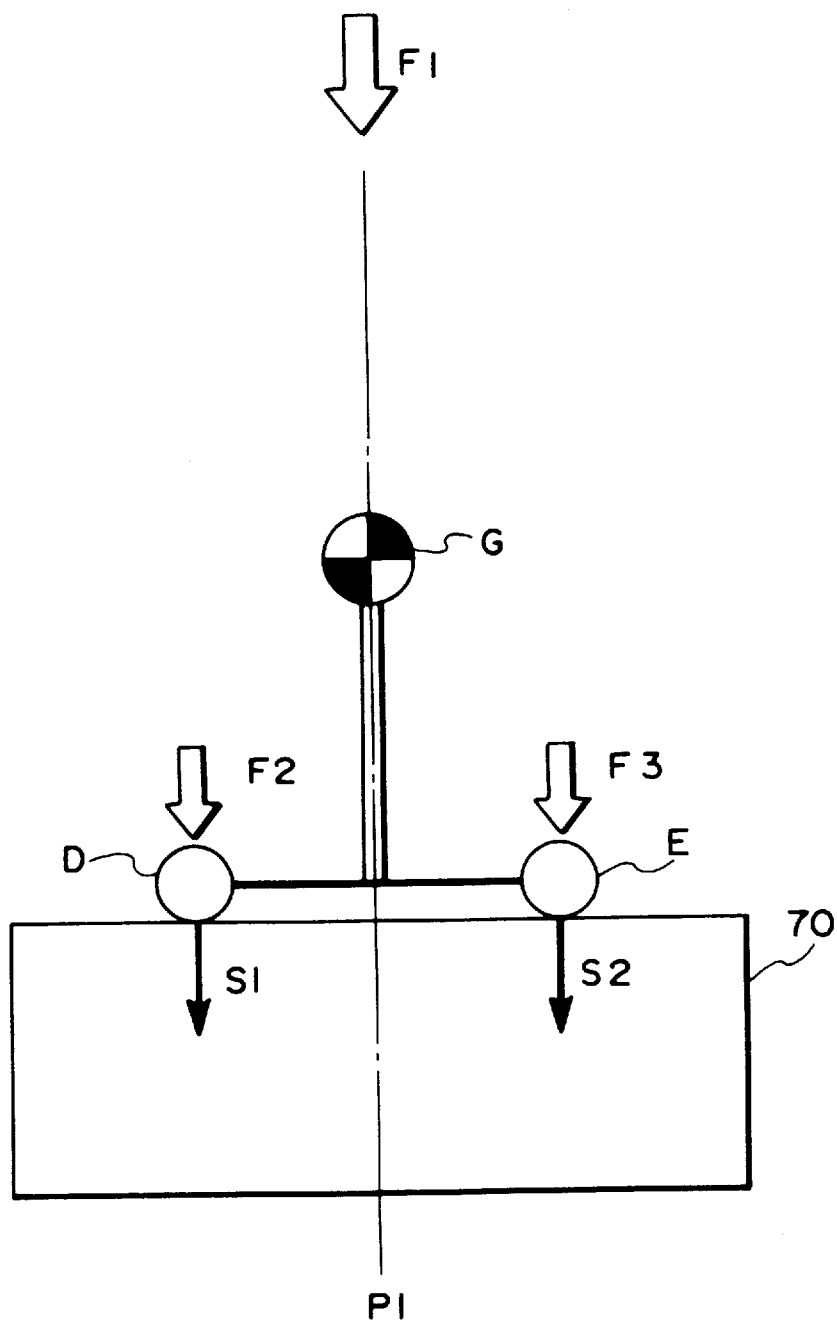
FIG. 23 is a view for explaining operation in a case in which no side force is applied to a vehicle seat structure relating to a conventional example.
Figure 24:
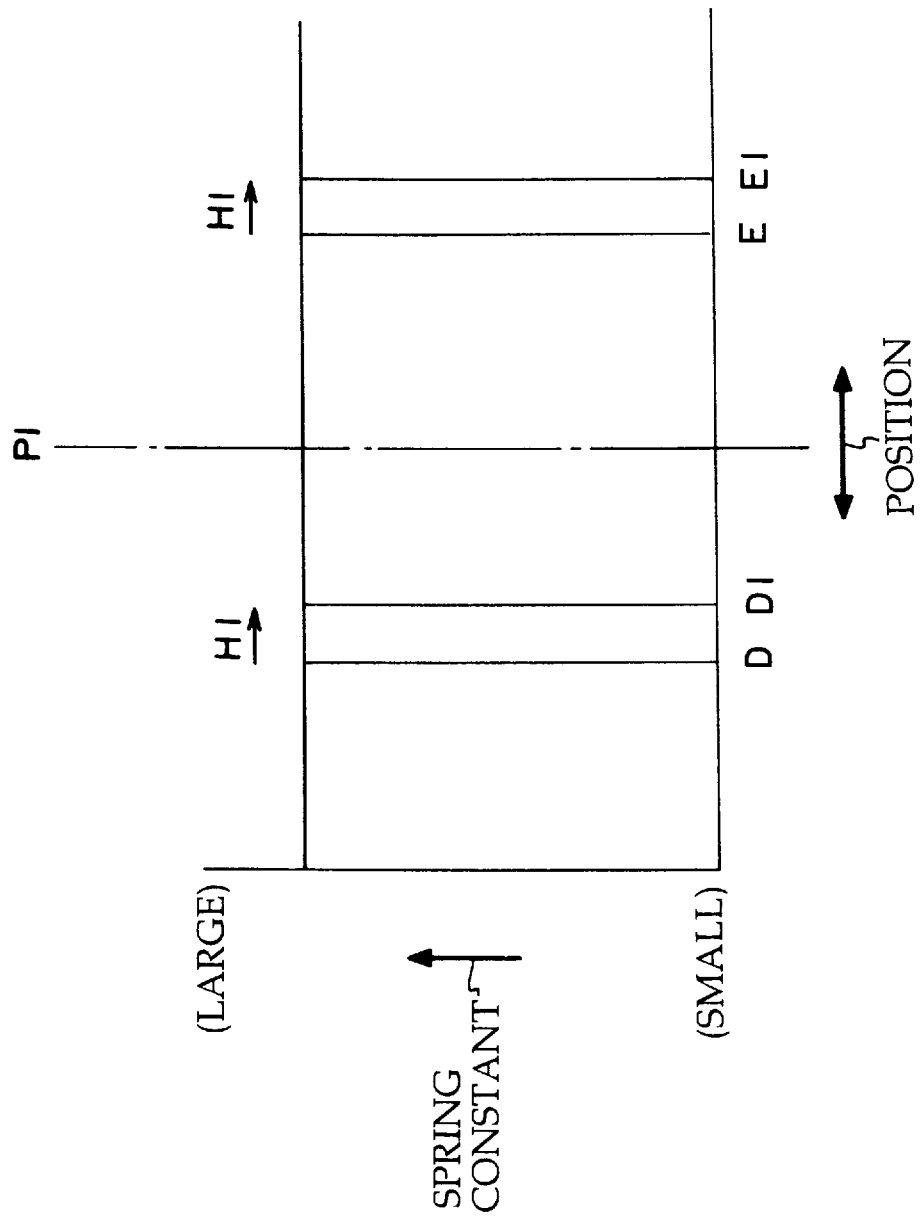
FIG. 24 is a graph illustrating a spring constant characteristic, for explaining operation of a vehicle seat structure relating to a conventional example.
Figure 25:
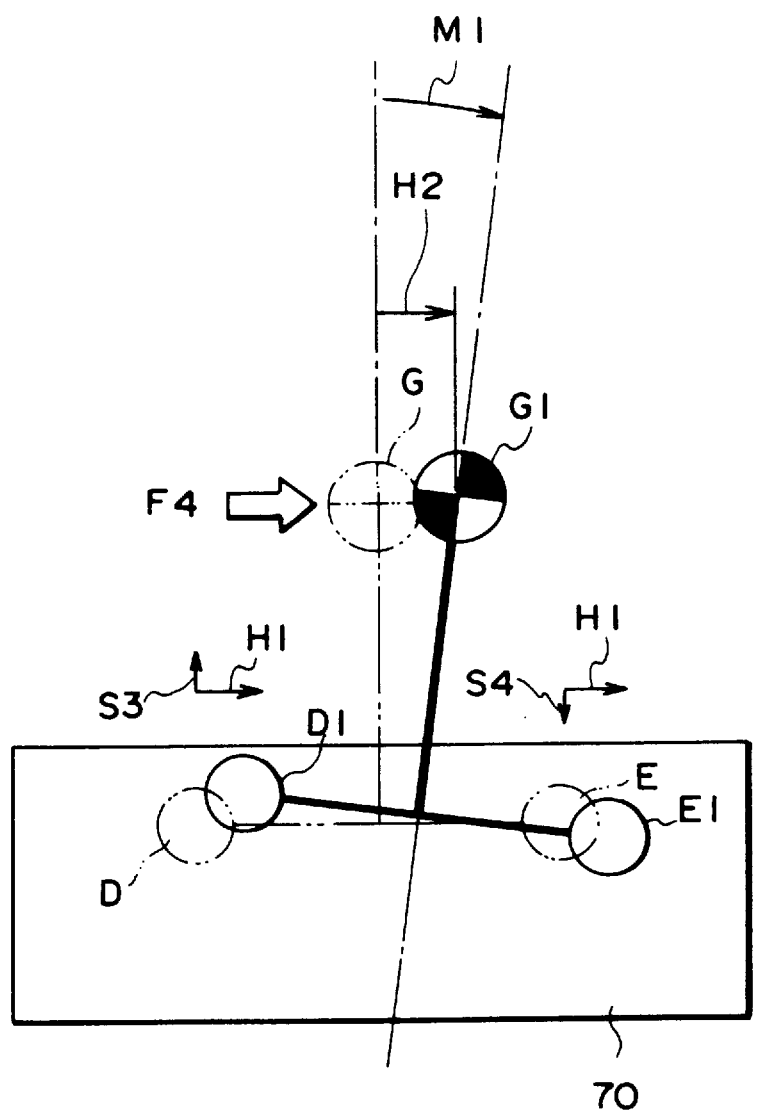
FIG. 25 is a view for explaining operation in a case in which side force is applied to a vehicle seat structure relating to a conventional example.

In the first embodiment, as illustrated in FIG. 2, the large holes 28 and the small holes 26 are formed in the surface of the urethane cushion 24 at the seat surface covering side. The large holes 28 are formed so as to have the same depth, and the small holes 26 are formed such that the small hole 26 at the vehicle occupant hip point position central portion P1 is deepest, and the small holes 26 become less deep toward the vehicle transverse direction peripheries. However, instead of these holes, as illustrated in FIG. 21, shallow holes 46 and deep holes 48 may be formed in the surface of the urethane cushion 24 at the seat surface covering side. The shallow holes 46 have a uniform depth. The deep holes 48 have a uniform depth, but are formed such that the deep holes 48 in a vicinity of the vehicle occupant hip point position central portion P1 have the greatest diameter, and the diameters of the deep holes 48 become smaller toward the vehicle transverse direction peripheries. Moreover, instead of holes, spaces may be formed by another space forming means such as cells (air bubbles) or the like.

Next, a fifth embodiment of the vehicle seat structure of the present invention will be described with reference to FIG. 28.

Members which are the same as those of the first embodiment are denoted by the same reference numerals, and description thereof is omitted.

Figure 28:
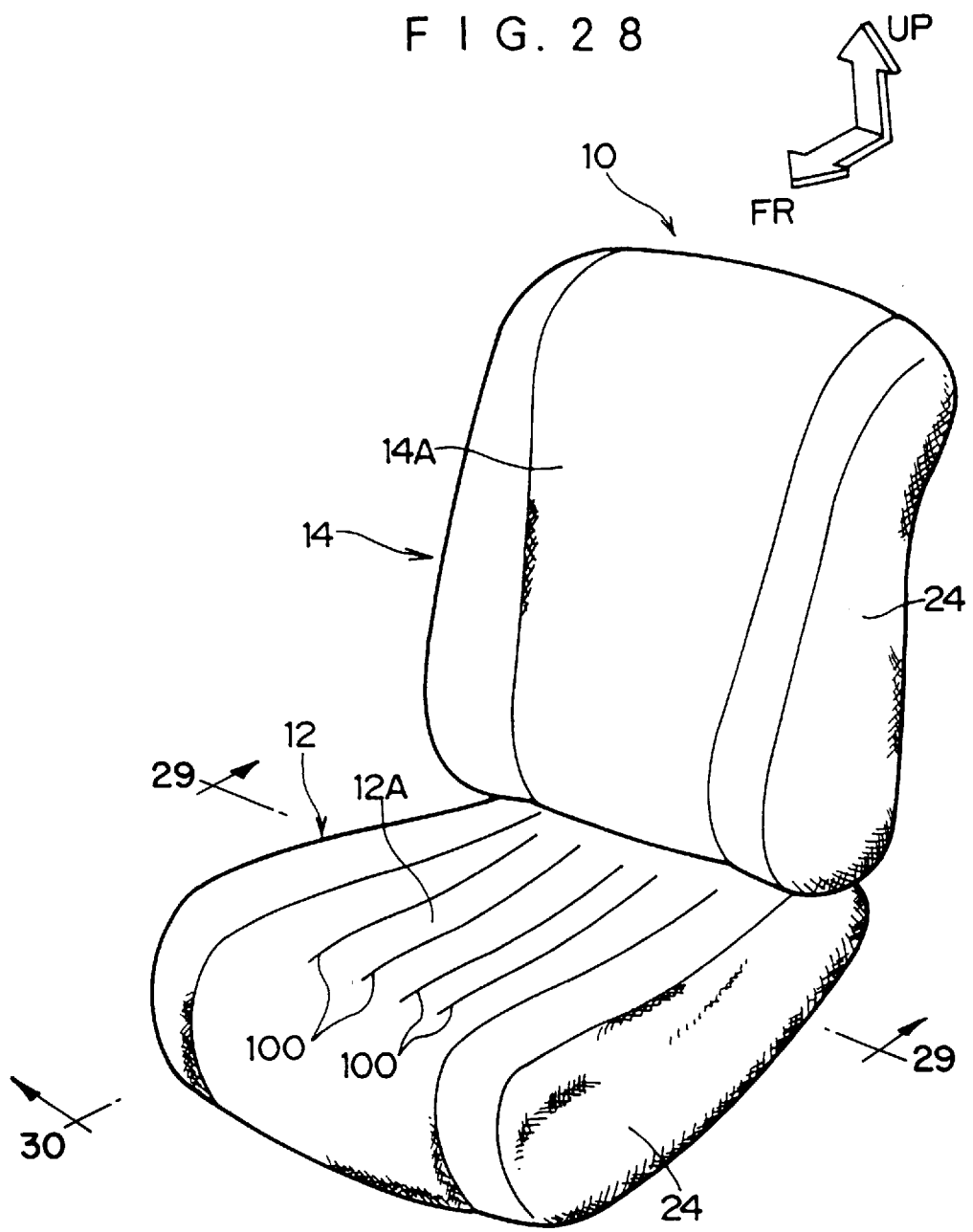
FIG. 28 is a perspective view, as viewed from the front of the vehicle and at an angle, illustrating a vehicle seat structure relating to a fifth embodiment of the present invention.
Figure 29A:
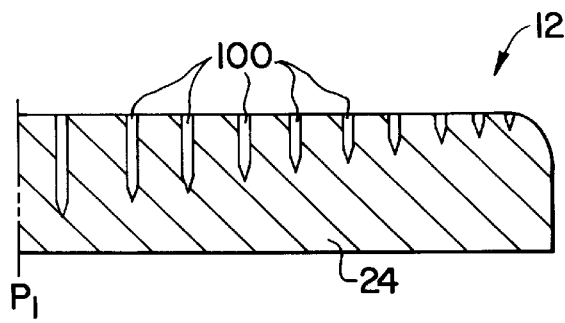
FIGS. 29A–C are cross-sections of the seat along section line "29—29" in FIG. 28 showing slits of varying depth, interval, and thickness, respectively.
Figure 29B:
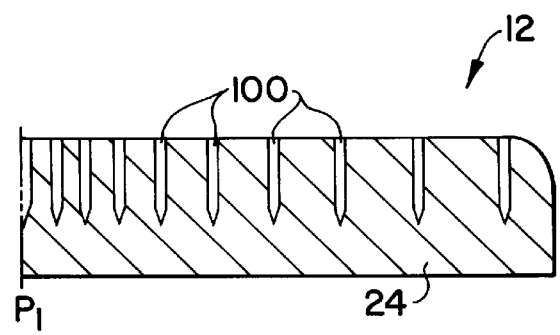
Figure 29C:
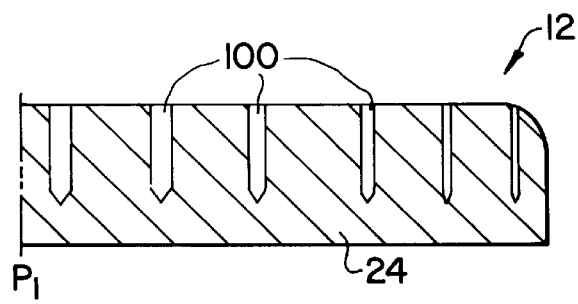
Figure 30:
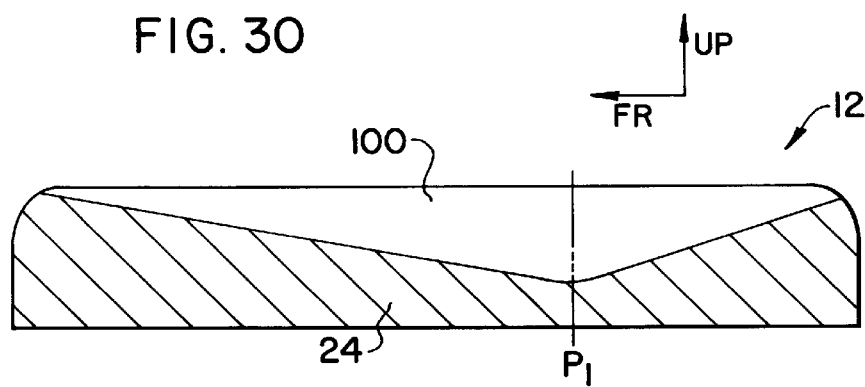
FIG. 30 is a cross-section of the seat along section line "30" in FIG. 28 showing varying slit depth from the back of the seat to the front of the seat.

As illustrated in FIG. 28, in the seat cushion 12 of the fifth embodiment, in place of the large number of small holes 26 and large holes 28 of the first embodiment, a plurality of slits 100 are provided so as to be aligned along the transverse direction of the vehicle such that the longitudinal directions of the slits 100 are substantially the longitudinal direction of the vehicle. Each of the slits 100 is formed such that the portion thereof at the vehicle longitudinal direction position corresponding to the vehicle occupant hip point position central portion P1 is the most deep, and the slit 100 becomes more shallow along the vehicle longitudinal direction from the central portion P1 (i.e., becomes more shallow toward the front of the vehicle from P1 and toward the rear of the vehicle from P1)(see FIG. 30) Further, among the plurality of slits 100, the slit 100 which is positioned at the vehicle occupant hip point position central portion P1 is the deepest, and the slits 100 become more shallow along the vehicle transverse directions from the central portion P1 (i.e., become more shallow toward each transverse direction periphery of the seat from the central portion P1)(see FIG. 29A). Alternatively, the slits may become more widely spaced (FIG. 29B) or the slits may become wider (FIG. 29C) progressing from the center P1 to the edge of the seat.

Although unillustrated, a plurality of slits may be provided at the seat back 14 of the fifth embodiment so as to be aligned along the transverse direction of the vehicle and such that the longitudinal directions of the slits run substantially along the vertical direction of the vehicle. In this case, the depths of the slits may be formed in the same way as those of the plurality of slits 100 provided in the seat cushion 12.

In accordance with the above-described structure, the same operational effects as those of the first embodiment can be obtained.

In the above-described fifth embodiment, the spring constant is adjusted by the depths of the slits. However, the present invention is not limited to the same, and the spring constant may be adjusted by varying the intervals between the slits, the widths of the slits, or the like.

What is claimed is:

1. A vehicle seat structure comprising:
a seat cushion having a spring constant distribution such that the spring constant of the seat cushion is lowest at a portion of the seat cushion which supports a central portion of a vehicle occupant at a hip point position of the vehicle occupant and increases continuously from the portion supporting the central portion of the vehicle occupant at the hip point position of the vehicle occupant toward vehicle transverse direction peripheries of said seat cushion.

2. A vehicle seat structure according to claim 1, wherein the spring constant distribution of said seat cushion is such that the spring constant of said seat cushion becomes continuously greater toward vehicle longitudinal direction peripheries of said seat cushion from the position supporting the central portion of the vehicle occupant at the hip point position of the vehicle occupant.

3. A vehicle seat structure according to claim 2, wherein said seat cushion has a space forming means in a cushion material which forms a portion of said seat cushion, said space forming means adjusting the spring constant.

4. A vehicle seat structure according to claim 3, wherein said space forming means is a large number of holes provided in a surface of the cushion material, and the spring constant is adjusted by at least one of depths of said holes, diameters of said holes, and density of said holes.

5. A vehicle seat structure according to claim 4, further comprising a second large number of holes formed in the surface of the cushion material interspersed with the first mentioned large number of holes, each of the second large number of holes having a larger diameter and less depth than each of the first mentioned large number of holes, and all of the second large number of holes having substantially the same depth.

6. A vehicle seat structure according to claim 4, wherein the surface of the cushion material is continuous between each of the large number of holes.

7. A vehicle seat structure according to claim 3, wherein said space forming means is a plurality of slits provided in a surface of the cushion material, and the spring constant is adjusted by at least one of depths of said slits, widths of said slits, and intervals between said slits.

8. A vehicle seat structure according to claim 2, wherein the spring constant of said seat cushion is adjusted by at least one of thickness and hardness of a cushion material which forms a portion of said seat cushion.

9. A vehicle seat structure according to claim 6, wherein the hardness of the cushion material is adjusted by superposing a plurality of cushion materials having different hardnesses.

10. A vehicle seat structure according to claim 1, wherein said seat cushion has a space forming means in a cushion material which forms a portion of said seat cushion, said space forming means adjusting the spring constant.

11. A vehicle seat structure according to claim 10, wherein said space forming means is a large number of holes provided in a surface of the cushion material, and the spring constant is adjusted by at least one of depths of said holes, diameters of said holes, and density of said holes.

12. A vehicle seat structure according to claim 10, wherein said space forming means is a plurality of slits provided in a surface of the cushion material, and the spring constant is adjusted by at least one of depths of said slits, widths of said slits, and intervals between said slits.

13. A vehicle seat structure according to claim 1, wherein the spring constant of said seat cushion is adjusted by at least one of thickness and hardness of a cushion material which forms a portion of said seat cushion.

14. A vehicle seat structure according to claim 13, wherein the hardness of the cushion material is adjusted by superposing a plurality of cushion materials having different hardnesses.

15. A vehicle seat structure comprising:

a seat back having a spring constant distribution such that the spring constant of the seat back is lowest at a central portion of a vehicle occupant back contacting portion of said seat back and increases continuously from the central portion of the vehicle occupant back contacting portion toward vehicle transverse directions of said seat back.

16. A vehicle seat structure according to claim 15, wherein said seat back has a space forming means in a cushion material which forms a portion of said seat back, said space forming means adjusting the spring constant.

17. A vehicle seat structure according to claim 16, wherein said space forming means is a large number of holes provided in a surface of the cushion material toward a seat back surface covering which forms a portion of said seat back, and the spring constant is adjusted by at least one of depths of said holes, diameters of said holes, and density of said holes.

18. A vehicle seat struct;ure according to claim 17, further comprising a second large number of holes formed in the surface of the cushion material interpersed with the first mentioned large number of holes, each of the second large number of holes having a larger diameter and less depth than each of the first mentioned large number of holes, and all of the second large number of holes having substantially the same depth.

19. A vehicle seat structure according to claim 17, wherein the surface of the cushion material is continous between each of the large number of holes.

20. A vehicle seat structure according to claim 15, wherein the spring constant of said seat back is adjusted by at least one of thickness and hardness of a cushion material which forms a portion of said seat back.

21. A vehicle seat structure according to claim 20, wherein the hardness of the cushion material is adjusted by superposing a plurality of cushion materials having different hardnesses.

* * * * *